US012494570B2

(12) United States Patent
Wu et al.

(10) Patent No.: US 12,494,570 B2
(45) Date of Patent: Dec. 9, 2025

(54) ULTRA-WIDEBAND ANTENNA AND ELECTRONIC APPARATUS

(71) Applicants: BEIJING BOE TECHNOLOGY DEVELOPMENT CO., LTD., Beijing (CN); BOE Technology Group Co., Ltd., Beijing (CN)

(72) Inventors: Qianhong Wu, Beijing (CN); Jingwen Guo, Beijing (CN); Chunxin Li, Beijing (CN); Jianxing Liu, Beijing (CN); Zibo Cao, Beijing (CN); Jianyun Zhao, Beijing (CN); Feng Qu, Beijing (CN)

(73) Assignee: Beijing BOE Technology Development Co., Ltd., Beijing (CN)

( * ) Notice: Subject to any disclaimer, the term of this patent is extended or adjusted under 35 U.S.C. 154(b) by 0 days.

(21) Appl. No.: 18/281,647

(22) PCT Filed: Nov. 17, 2022

(86) PCT No.: PCT/CN2022/132641
§ 371 (c)(1),
(2) Date: Sep. 12, 2023

(87) PCT Pub. No.: WO2024/103349
PCT Pub. Date: May 23, 2024

(65) Prior Publication Data

US 2025/0030156 A1 Jan. 23, 2025

(51) Int. Cl.
*H01Q 1/52* (2006.01)
*H01Q 9/04* (2006.01)
*H01Q 19/00* (2006.01)

(52) U.S. Cl.
CPC ............ *H01Q 1/52* (2013.01); *H01Q 9/0407* (2013.01); *H01Q 19/005* (2013.01)

(58) Field of Classification Search
CPC ...... H01Q 1/52; H01Q 9/0407; H01Q 19/005; H01Q 1/38; H01Q 1/50; H01Q 5/25
See application file for complete search history.

(56) References Cited

U.S. PATENT DOCUMENTS 6,133,879 A * 10/2000 Grangeat ............ H01Q 9/0407 343/700 MS
6,323,810 B1 * 11/2001 Poilasne ................ H01Q 5/357 343/846

(Continued)

FOREIGN PATENT DOCUMENTS

CN 103151608 A 6/2013
CN 103187626 A 7/2013

(Continued)

OTHER PUBLICATIONS

Song L. et al., Compact Leaf Shaped UWB Monopole antenna, IEEE Xplore, p. 115-117, 2017. (3 pages).

*Primary Examiner* — Dameon E Levi
*Assistant Examiner* — Jordan E. DeWitt
(74) *Attorney, Agent, or Firm* — WHDA, LLP

(57) ABSTRACT

The present application provides an ultra-wideband antenna and an electronic apparatus, which relates to the technical field of mobile communication. The ultra-wideband antenna includes: a first substrate; a feed structure provided at a side of the first substrate; and a radiating structure provided on the one side of the first substrate and electrically connected to the feed structure, wherein the radiating structure includes a radiating patch and a wave-trapping unit, and the radiating patch is electrically connected to the feed structure. The novel ultra-wideband antenna has the characteristic of being capable of reconstructing the trapped wave provided by the present application may have a wide broadband, and may (Continued)

also trap wave, thereby reducing or even preventing mutual interference with communication protocols of other frequency bands during use.

16 Claims, 8 Drawing Sheets

(56) References Cited

U.S. PATENT DOCUMENTS

| | | | | |
|---|---|---|---|---|
| 6,466,176 | B1 * | 10/2002 | Maoz | H01Q 1/38 343/702 |
| 6,714,169 | B1 * | 3/2004 | Chau | H01Q 23/00 333/262 |
| 7,061,442 | B1 * | 6/2006 | Tang | H01Q 5/28 343/770 |
| 10,903,566 | B2 * | 1/2021 | Di Nallo | H01Q 3/2605 |
| 2004/0027292 | A1 * | 2/2004 | Gabriel | H01Q 5/378 343/700 MS |
| 2005/0110687 | A1 * | 5/2005 | Starkie | H01Q 5/00 343/795 |
| 2005/0253767 | A1 * | 11/2005 | Liu | H01Q 13/106 343/770 |
| 2010/0182210 | A1 * | 7/2010 | Ryou | H01Q 13/10 343/722 |
| 2016/0079676 | A1 * | 3/2016 | Chuang | H01Q 5/357 343/770 |
| 2018/0331429 | A1 * | 11/2018 | Kornaros | H01Q 9/0414 |
| 2019/0131699 | A1 * | 5/2019 | Shamblin | H01Q 19/005 |
| 2025/0030156 | A1 * | 1/2025 | Wu | H01Q 1/50 |

FOREIGN PATENT DOCUMENTS

| | | | | |
|---|---|---|---|---|
| CN | 104218316 | A | 12/2014 | |
| CN | 107706523 | A | 2/2018 | |
| CN | 111082225 | A | 4/2020 | |
| CN | 115084858 | A * | 9/2022 | H01Q 1/50 |
| KR | 100948265 | B1 | 3/2010 | |
| WO | WO-2011087452 | A1 * | 7/2011 | H01Q 21/064 |

* cited by examiner

ULTRA-WIDEBAND ANTENNA AND ELECTRONIC APPARATUS

TECHNICAL FIELD

The present application relates to the technical field of mobile communication, and particularly relates to, an ultra-wideband antenna and an electronic apparatus.

BACKGROUND

With the continuous development of mobile communication technologies, ultra-wideband antennas are being increasingly extensively applied. When a working frequency band of the ultra-wideband antenna has a frequency band of another communication protocol, the communications of them may form harmful interference therebetween. In order to avoid the mutual interference between the ultra-wideband antenna and communication protocols of other frequency bands during use, the ultra-wideband antenna may be improved, so that the ultra-wideband antenna has a larger reflection coefficient is generated at a frequency band that the ultra-wideband antenna is prone to interference in communication, to present a characteristic of "wave trapping".

SUMMARY

The embodiments of the present application adopt the following technical solutions:

In an aspect, an embodiment of the present application provides an ultra-wideband antenna, wherein the ultra-wideband antenna includes:

a first substrate;

a feed structure provided at a side of the first substrate; and a radiating structure provided at the side of the first substrate and electrically connected to the feed structure, wherein the radiating structure includes a radiating patch and a wave-trapping unit, and the radiating patch is electrically connected to the feed structure.

Optionally, the wave-trapping unit includes at least one groove, and the groove penetrates through the radiating patch; and a part of the radiating patch that is not penetrated through by the groove is configured to, under the condition of being in a disconnection state, be capable of controlling a working frequency band of the ultra-wideband antenna to have a trapped wave, and under the condition of being in a connection state, be capable of controlling the working frequency band of the ultra-wideband antenna not to have the trapped wave.

Optionally, the wave-trapping unit further includes a switch, and the switch is configured to be capable of controlling whether the part of the radiating patch that is not penetrated through by the groove is disconnected.

Optionally, an orthographic projection of the switch on the first substrate at least partially overlaps with an orthographic projection of a pattern that formed by an outer contour of the groove on the first substrate; and the switch is configured to, under the condition of being in an on-state, be capable of controlling the part of the radiating patch that is not penetrated through by the groove to be in the disconnection state, and under the condition of being in an off-state, be capable of controlling the part of the radiating patch that is not penetrated through by the groove to be in the connection state.

Optionally, the orthographic projection of the switch on the first substrate is located within the orthographic projection of the pattern that formed by the outer contour of the groove on the first substrate.

Optionally, the orthographic projection of the pattern that formed by the outer contour of the groove on the first substrate is a symmetrical pattern, and the symmetrical pattern is symmetrical about a first symmetry axis; and the orthographic projection of the switch on the first substrate is located on the first symmetry axis of the orthographic projection of the pattern that formed by the outer contour of the groove on the first substrate.

Optionally, the wave-trapping unit includes one groove, an orthographic projection of a pattern that formed by an outer contour of the groove on the first substrate includes a first sub-part, a connecting part and a second sub-part, and the first sub-part is communicated to the second sub-part by the connecting part;

an extension direction of the first sub-part and an extension direction of the second sub-part are both different from an extension direction of the connecting part; and the orthographic projection of the switch on the first substrate is located on the first symmetry axis of an orthographic projection of a pattern that formed by an outer contour of the connecting part on the first substrate.

Optionally, the connecting part includes one or more sub-connecting parts, and the first sub-part is communicated to the second sub-part by all of the sub-connecting parts;

the extension direction of the first sub-part and the extension direction of the second sub-part are both different from extension directions of all of the sub-connecting parts; and the orthographic projection of the switch on the first substrate is located on the first symmetry axis of an orthographic projection of a pattern that formed by outer contours of each of the sub-connecting parts on the first substrate.

Optionally, the connecting part includes a first sub-connecting part, and the extension direction of the first sub-part and the extension direction of the second sub-part are the same, and are all perpendicular to an extension direction of the first sub-connecting part;

both ends of the first sub-connecting part are communicated to an end of the first sub-part and an end of the second sub-part respectively; and the orthographic projection of the switch on the first substrate is located on the first symmetry axis of an orthographic projection of a pattern that formed by an outer contour of the first sub-connecting part on the first substrate.

Optionally, the connecting part includes a first sub-connecting part, and the extension direction of the first sub-part and the extension direction of the second sub-part are the same, and are all perpendicular to an extension direction of the first sub-connecting part;

both ends of the first sub-connecting part are communicated to a geometric center of the first sub-part and a geometric center of the second sub-part respectively; and the orthographic projection of the switch on the first substrate is located on the first symmetry axis of an orthographic projection of a pattern that formed by an outer contour of the first sub-connecting part on the first substrate.

Optionally, the wave-trapping unit is configured to also be capable of controlling a frequency band in the working frequency band of the ultra-wideband antenna that having a trapped wave.

Optionally, the connecting part includes a second sub-connecting part and a third sub-connecting part, the extension direction of the first sub-part and the extension direction of the second sub-part are the same, and an extension direction of the second sub-connecting part and an extension direction of the third sub-connecting part are the same, and the extension direction of the first sub-part is perpendicular to the extension direction of the second sub-connecting part;

both ends of the second sub-connecting part are communicated to an end of the first sub-part and an end of the second sub-part respectively, and both ends of the third sub-connecting part are communicated to a geometric center of the first sub-part and a geometric center of the second sub-part; and the orthographic projection of the switch on the first substrate is located on the first symmetry axis of an orthographic projection of a pattern that formed by an outer contour of the second sub-connecting part on the first substrate; or the orthographic projection of the switch on the first substrate is located on the first symmetry axis of an orthographic projection of a pattern that formed by an outer contour of the third sub-connecting part on the first substrate.

Optionally, the connecting part includes a second sub-connecting part and a third sub-connecting part, the extension direction of the first sub-part and the extension direction of the second sub-part are the same, and an extension direction of the second sub-connecting part and an extension direction of the third sub-connecting part are the same, and the extension direction of the first sub-part is perpendicular to the extension direction of the second sub-connecting part;

both ends of the second sub-connecting part are communicated to an end of the first sub-part and an end of the second sub-part respectively, and both ends of the third sub-connecting part are communicated to a geometric center of the first sub-part and a geometric center of the second sub-part respectively;

the switch includes a first switch and a second switch, and an orthographic projection of the first switch on the first substrate is located on the first symmetry axis of an orthographic projection of a pattern that formed by an outer contour of the third sub-connecting part on the first substrate; and an orthographic projection of the second switch on the first substrate is located on the first symmetry axis of an orthographic projection of a pattern that formed by an outer contour of the second sub-connecting part on the first substrate.

Optionally, the wave-trapping unit is configured to be capable of controlling a number of trapped waves that appear in the working frequency band of the ultra-wideband antenna.

Optionally, the wave-trapping unit includes a first groove and a second groove, and a length of an orthographic projection of an outer contour of the first groove on the first substrate is different from a length of an orthographic projection of an outer contour of the second groove on the first substrate;

the switch includes a first switch and a second switch, and an orthographic projection of the first switch on the first substrate is located on the first symmetry axis of an orthographic projection of a pattern that formed by an outer contour of the second groove on the first substrate; and an orthographic projection of the second switch on the first substrate is located on the first symmetry axis of an orthographic projection of a pattern that formed by an outer contour of the first groove on the first substrate.

Optionally, the length of the orthographic projection on the first substrate of the outer contour of the first groove is larger than the length of the orthographic projection of the outer contour of the second groove on the first substrate, an opening direction of the first groove and an opening direction of the second groove are the same, and the second groove is nested in the first groove, and is spaced apart from the first groove.

Optionally, an opening direction of the first groove is opposite to an opening direction of the second groove, and the first groove and the second groove are spaced apart from each other.

Optionally, the switch includes a micro-electromechanical system switch, the micro-electromechanical system switch includes a cantilever beam, an end of the cantilever beam is electrically connected to the radiating patch at a side of the groove, and the other end of the cantilever beam is configured to, in a first state, non-electrically connected to the radiating patch at the other side of the groove, and in a second state, electrically connected to the radiating patch at the other side of the groove.

Optionally, the radiating patch at a side of the groove has a first cubic block in a direction along the groove, the radiating patch at the other side of the groove has a second cubic block in the direction along the groove, and the first cubic block is insulated from the second cubic block;

the micro-electromechanical system switch further includes a first electrode, an insulating layer and a second electrode, and the first electrode is provided between the first cubic block and the second cubic block, and is insulated from both of the first cubic block and the second cubic block;

the insulating layer is provided at a side of the first electrode away the first substrate;

the second electrode is provided at a side of the second cubic block away from the first substrate, and is connected to the second cubic block; and an end of the cantilever beam is connected to a side of the first cubic block away from the first substrate, and the other end of the cantilever beam is configured to, when at least one of the first electrode and the radiating patch is not applied with a voltage, or a voltage difference between a voltage applied to the first electrode and a voltage applied to the radiating patch does not satisfy a driving voltage, not be connected to the second electrode, and when the voltage difference between the voltage applied to the first electrode and the voltage applied to the radiating patch satisfies the driving voltage, be connected to the second electrode.

Optionally, an orthographic projection pattern of the radiating patch on the first substrate includes a plurality of ellipses, and at least some of the ellipses among the plurality of ellipses are symmetrical about the first symmetry axis.

Optionally, major axes of all of the plurality of ellipses are the same, and minor axes of all of the plurality of ellipses are the same; and included angles between extension directions of the adjacent ellipses are the same.

Optionally, the feed structure includes a feed line, a first grounding plate and a second grounding plate, the feed line is located between the first grounding plate and the second grounding plate, and is spaced apart from both the first grounding plate and the second grounding plate, and the feed line is connected to the radiating patch.

In another aspect, an embodiment of the present application provides an electronic apparatus, wherein the electronic device includes the ultra-wideband antenna stated above-mentioned.

The above-mentioned description is merely a summary of the technical solutions of the present application. In order to more clearly know the technical means of the present application to enable the implementation according to the content of the description, and in order to make the above-mentioned and other purposes, features and advantages of the present application more apparent and understandable, the particular embodiments of the present application are provided below.

BRIEF DESCRIPTION OF THE DRAWINGS

In order to more clearly illustrate the technical solutions of the embodiments of the present application or the related art, the figures that are required to describe the embodiments or the related art will be briefly described below. Apparently, the figures that are described below are merely some embodiments of the present application, and a person skilled in the art can obtain other figures according to these figures without paying creative work.

DETAILED DESCRIPTION

Figure 1:
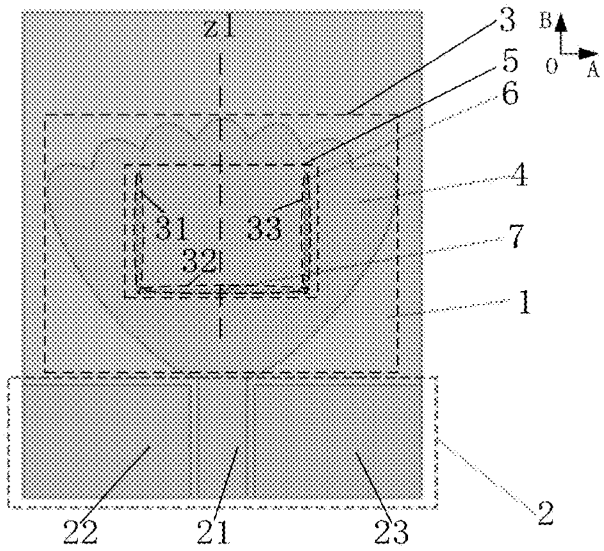
FIG. 1 is a schematic structural diagram of a first type of the ultra-wideband antenna according to an embodiment of the present application.

In order to make the objects, the technical solutions and the advantages of the embodiments of the present application clearer, the technical solutions of the embodiments of the present application will be clearly and completely described below with reference to the drawings of the embodiments of the present application. Apparently, the described embodiments are merely certain embodiments of the present application, rather than all of the embodiments. All of the other embodiments that a person skilled in the art obtains on the basis of the embodiments of the present application without paying creative work fall within the protection scope of the present application.

In the drawings, in order for clarity, the thicknesses of regions and layers might be exaggerated. In the drawings, the same reference symbol represents the same or similar structure, and therefore the detailed description about them are omitted. Moreover, the drawings are merely schematic illustrations of the present application, and are not necessarily drawn to scale.

In the embodiments of the present application, unless stated otherwise, the meaning of "plurality of" is "two or more". The terms that indicate orientation or position relations, for example "upper", are based on the orientation or position relations shown in the drawings, and are merely for conveniently describing the present application and simplifying the description, rather than indicating or implying that the structure or element must have the specific orientation and be constructed and operated according to the specific orientation. Therefore, they should not be construed as a limitation on the present application.

Unless stated otherwise in the context, throughout the description and the claims, the term "include" is interpreted as the meaning of opened containing, that is, "including but not limited to". In the description of the present application, the terms "one embodiment", "some embodiments", "exemplary embodiments", "example", "specific example" or "some examples" are intended to indicate that specific features, structures, materials or characteristics related to the embodiment or example are included in at least one embodiment or example of the present application. The illustrative indication of the above terms does not necessarily refer to a same embodiment or example. Moreover, the specific features, structures, materials or characteristics may be included in any one or more embodiments or examples in any suitable manner.

In the embodiments of the present application, terms for example "first" and "second" and the like are used to distinguish identical items or similar items that have substantially the same functions and effects, merely in order to clearly describe the technical solutions of the embodiments of the present application, and should not be construed as indicating or implying relative importance or implicitly indicating the number of the specified technical features.

As restricted by adverse factors for example a narrow frequency bandwidth, a low transmission speed and a poor safety performance, traditional communication technologies are gradually becoming difficult to adapt to the requirements of novel communication technologies, and accordingly many novel communication technologies, for example, an Ultra-Wide Band (UWB) technology, emerge. The UWB technology has the advantages of large system capacity, good confidentiality and high transmission speed and the like.

An Ultra-wideband antenna is one of the ultra-wide-band communications. In 2002, the Federal Communications Commission (FCC) officially approved the ultra-wideband frequency band of 3.1-10.6 GHz for civil communication, and since this, the ultra-wideband antenna causes increasingly more extensive attention and research. When the frequency bands of other communication protocols exist in the working frequency band of the ultra-wideband antenna, harmful interference must be formed between them, and the communication qualities of each other are deteriorated. In order to avoid mutual interference among communication protocols of the ultra-wideband antenna and other frequency bands during use, the ultra-wideband antenna may be improved, so that a large reflection coefficient is generated at a frequency band that the ultra-wideband antenna is prone to interference in communication, to present the characteristic of "wave trapping", thereby effectively reducing or even preventing interference among the different communications of different frequency bands. As an example, a narrow-band trapped wave may be introduced into the working frequency band of the ultra-wideband antenna, for example, trapped waves for a WiMAX narrow-band communication system (the frequency band is 3.3-3.8 GHz), a WLAN narrow-band system (the frequency band is 5.15-5.825 GHz), a X-wave-band communication satellite downlink wave-band signal system (the frequency band is 7.25-7.75 GHz) and so on Consequently, it is urgently needed to provide a novel ultra-wideband antenna, to make the ultra-wideband antenna has a trapped wave.

On the basis of the above-mentioned, an embodiment of the present application provides an ultra-wideband antenna. Referring to FIG. 1, the ultra-wideband antenna includes:

a first substrate 1;

a feed structure 2 provided on one side of the first substrate 1; and a radiating structure 3 provided on the side of the first substrate 1 and electrically connected to the feed structure 2, wherein the radiating structure 3 includes a radiating patch 4 and a wave-trapping unit 5, and the radiating patch 4 is electrically connected to the feed structure 2.

The structure of the first substrate is not particularly limited herein. As an example, film layers for example the feed structure and the radiating structure may be formed directly on the first substrate. Alternatively, the first substrate may include a base substrate, the film layers for example the feed structure and the radiating structure may be formed directly on the base substrate, which is decided particularly according to practical applications.

The material of the first substrate is not particularly limited. As an example, the material of the first substrate may include glass, epoxy resin, Polyethylene Terephthalate (PET), PI (Polyimide) and so on. The glass is not particularly limited herein. As an example, the glass may include transparent glass. Alternatively, the glass may include non-transparent glass. In order to make the ultra-wideband antenna better match a circuit based on a glass substrate and so on, as a further example, the material of the first substrate is a transparent glass. The epoxy resin is not particularly limited herein. As an example, the epoxy resin may be FR4 and so on.

The dielectric constant of the first substrate is not particularly limited herein. As an example, a range of the dielectric constant of the first substrate may include 3-5. Particularly, the dielectric constant of the first substrate may be 3, 4, 4.4, 5 and so on. Further optionally, the dielectric constant of the first substrate is 4.4.

The shape, size and thickness of the first substrate are not particularly limited herein. As an example, the shape of the first substrate may be a cuboid, a cube and so on. If the shape of the first substrate is a cuboid, a range of the length of the first substrate may include 31-33 mm, a range of the width of the first substrate may include 23-25 mm, and a range of the height of the first substrate may include 1-2 mm. Particularly, the length of the first substrate may be 31 mm, 33 mm, 33 mm and so on. The width of the first substrate may be 23 mm, 24 mm, 25 mm and so on. The height of the first substrate may be 1 mm, 1.3 mm, 1.6 mm, 1.9 mm, 2 mm and so on. Further optionally, the height of the first substrate is 1.6 mm.

The type of the feed structure is not particularly limited herein. As an example, the feed structure may be a Coplanar Waveguide (CPW), as shown in FIG. 1. Alternatively, the feed structure may be a Grounded Coplanar Waveguide (GCPW). Certainly, the feed structure may also be a structure of another type, which is decided particularly according to practical applications. The embodiments of the present application take the case as an example for the description in which the feed structure is a CPW.

The radiating structure is electrically connected to the feed structure. The mode of the electric connection between the radiating structure and the feed structure is not particularly limited herein. As an example, the radiating structure and the feed structure may be directly electrically connected. Alternatively, the radiating structure and the feed structure may be electrically connected by another structure.

The shape and the material of the radiating patch are not particularly limited herein. As an example, the shape of the radiating patch may include a plurality of ellipses. Certainly, the shape of the radiating patch may also be any other pattern, which may be decided according to the area of the first substrate. As an example, the material of the radiating patch may include metal, for example, copper (Cu) and so on.

The wave-trapping unit above-mentioned is configured to be at least capable of controlling whether the working frequency band of the ultra-wideband antenna has a trapped wave, that is, the wave-trapping unit is configured to be merely capable of controlling whether the working frequency band of the ultra-wideband antenna has a trapped wave. Alternatively, the wave-trapping unit is configured to be not only capable of controlling whether the working frequency band of the ultra-wideband antenna has a trapped wave, but also capable of controlling the number, the frequency band of the trapped wave that appear in the working frequency band of the ultra-wideband antenna, and so on, of the trapped waves that appear in the working frequency band of the ultra-wide-band antenna, which is not particularly limited herein. The structure of the wave-trapping unit is not particularly limited herein. As an example, the wave-trapping unit 5 may include a groove 6 and a switch 7 shown in FIG. 1.

The radiating patch is electrically connected to the feed structure. The mode of the electric connection between the radiating patch and the feed structure is not particularly limited herein. As an example, the radiating patch and the feed structure may be directly electrically connected. Alternatively, the radiating patch and the feed structure may be electrically connected by another structure.

The wave-trapping unit above-mentioned is configured to be at least capable of controlling whether the working frequency band of the ultra-wideband antenna has a trapped wave refers to that the wave-trapping unit is configured to be capable of controlling whether the working frequency band of the ultra-wide-band antenna has a trapped wave, or the wave-trapping unit is configured to be not only capable of controlling whether the working frequency band of the ultra-wide-band antenna has a trapped wave, but also having other functions. For example, the wave-trapping unit is configured to be further capable of controlling the frequency band and the number of the trapped wave that appear in the ultra-wideband antenna, which is decided particularly according to practical demands.

It should be noted that, the ultra-wideband antenna may also be electrically connected to another structure, for example, electrically connected to a SubMiniature version A (SMA) connector. Particularly, the SMA connector is electrically connected to the feed structure, so that the SMA connector may be used to transmit an electromagnetic wave or receive an electromagnetic wave.

The embodiments of the present application provide an ultra-wideband antenna, wherein the ultra-wideband antenna includes a first substrate; a feed structure provided on a side of the first substrate; and a radiating structure provided on the side of the first substrate and electrically connected to the feed structure. The radiating structure includes a radiating patch and a wave-trapping unit, and the radiating patch is electrically connected to the feed structure. The wave-trapping unit is configured to be at least capable of controlling whether the working frequency band of the ultra-wideband antenna has a trapped wave. Accordingly, the reconstruction of the existence or inexistence of a trapped wave in the ultra-wideband antenna may be realized by means of the wave-trapping unit, thereby a novel ultra-wideband antenna that may reconstruct the wave-trapping characteristic is provided, so that the ultra-wideband antenna has the characteristic of wider broadband, and may reduce or even avoid mutual interference with communication protocols of other frequency bands in the use process at the same time, the performance of the ultra-wideband antenna is effectively improved, and the usage scenarios of the ultra-wideband antenna are broadened, the user experience is further improved.

Figure 11:
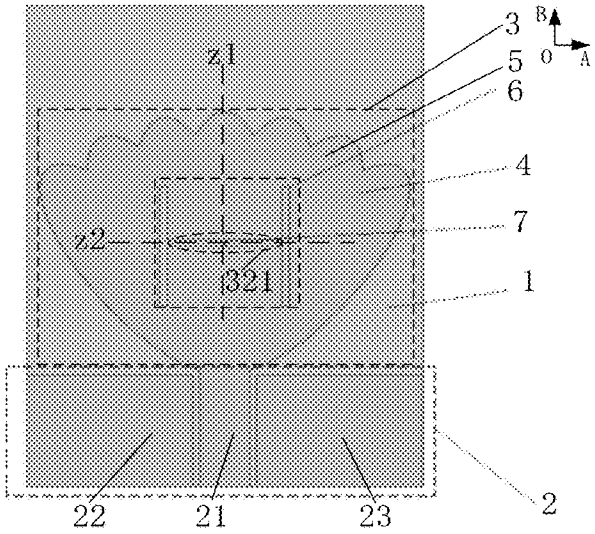
FIG. 11 is a schematic structural diagram of a second type of the ultra-wideband antenna according to an embodiment of the present application.
Figure 12:
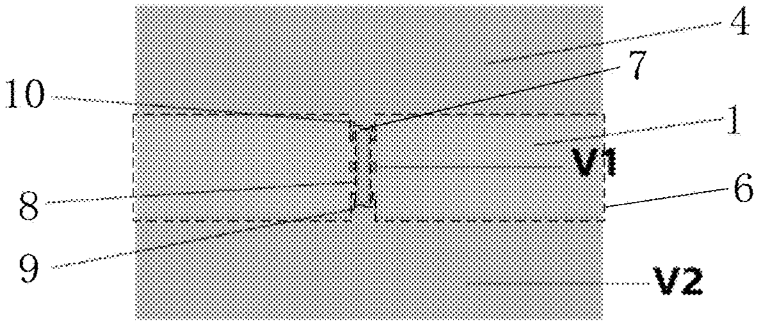
FIG. 12 is a partially enlarged schematic diagram of the switch of the second type of the ultra-wideband antenna according to an embodiment of the present application.

Optionally, referring to FIGS. 1 and 11, the wave-trapping unit 5 includes at least one groove 6, and the groove 6 penetrates through the radiating patch 4. A part of the radiating patch 4 that is not penetrated through by the groove 6 is configured to, under the condition of being in a disconnection state, be capable of controlling a working frequency band of the ultra-wideband antenna to have a trapped wave, and under the condition of being in a connection state, be capable of controlling the working frequency band of the ultra-wideband antenna not to have the trapped wave.

The wave-trapping unit above-mentioned includes at least one groove refers to that the wave-trapping unit includes one groove, or the wave-trapping unit includes a plurality of grooves, which is decided particularly according to practical applications. If the wave-trapping unit includes a plurality of grooves, the arrangement mode of the plurality of grooves is not particularly limited herein, and may be decided according to the area of the radiating patch. As an example, when the wave-trapping unit includes two grooves, the two grooves may be arranged side by side in the direction along a first symmetry axis z1 and be spaced apart from each other, and in this case the opening directions of the two grooves may be the same or different. Alternatively, the two grooves may be arranged side by side in the direction along a second symmetry axis z2 and be spaced apart from each other, and in this case the opening directions of the two grooves may be the same or different.

It should be noted that, referring to FIGS. 1 and 11, an orthographic projection of a pattern that formed by the outer contour of the groove 6 on the first substrate 1 includes a first sub-part 31, a connecting part 32 and a second sub-part 33, and the first sub-part 31 is communicated to the second sub-part 33 by the connecting part 32. The first symmetry axis z1 is on a geometric center of the connecting part 32, and extends along a first direction (the direction of OB shown in the figure), and the first sub-part 31 and the second sub-part 33 are axially symmetric about the first symmetry axis z1.

The second symmetry axis z2 is on a geometric center of the first sub-part 31 and the geometric center of the second sub-part 33, and extends along a second direction (the direction of OA shown in the figure).

The shape of the groove is not particularly limited herein. As an example, the shape of the orthographic projection of the groove on the first substrate may include a U shape, an H shape, a V shape, a straight-line shape, an A shape, an inversed A shape and so on. FIG. 1 illustrates by taking the case as an example in which the shape of the orthographic projection of the groove 6 on the first substrate 1 is a U shape. FIG. 11 illustrates by taking the case as an example in which the shape of the orthographic projection of the groove 6 on the first substrate 1 is an H shape.

In the ultra-wideband antenna according to the embodiments of the present application, the existence or inexistence of a trapped wave may be controlled by the communication or disconnection of the radiating patches on both sides of the groove, so that the ultra-wideband antenna that has the characteristic of being capable of reconstructing the trapped wave does not only have the characteristic of wide broadband, but also may reduce or even avoid mutual interference with communication protocols of other frequency bands during use, the performance of the ultra-wideband antenna is effectively improved, and the usage scenarios of the ultra-wideband antenna are broadened, so that the user experience is further improved.

Optionally, referring to FIG. 1, the wave-trapping unit 5 further includes a switch 7, and the switch 7 is configured to be capable of controlling whether the part of the radiating patch 4 that is not penetrated through the groove 6 d is disconnected.

The type of the switch is not particularly limited herein. As an example, the switch may include a Micro-Electromechanical System (MEMS) switch. The MEMS switch is a device having a size of several millimeters or even smaller, and its internal structure is generally at a scale of micrometer or even nanometer, and it is an independent intelligent system The number of the switch above-mentioned is not particularly limited herein. As an example, the number of the switch above-mentioned on one groove may be one, or the number of the switch above-mentioned on one groove may be more than one, which is decided particularly according to practical applications. All of the embodiments of the present application illustrate by taking a MEMS switch as an example, and, at the same time, considering that one MEMS switch provided on one groove may have an excellent effect and save materials, preferably one MEMS switch is provided on one groove.

In the ultra-wideband antenna according to the embodiments of the present application, the part of the radiating patches on both sides of the groove that is not penetrated through by the groove may be controlled to be connected or disconnected by means of the switch, and the existence or inexistence of a trapped wave may be controlled by the communication or disconnection of the radiating patches on both sides of the groove, so that the ultra-wideband antenna that has the characteristic of being capable of reconstructing the trapped wave does not only have the characteristic of wide broadband, but also may reduce or even avoid mutual interference with communication protocols of other frequency bands during use, the performance of the ultra-wideband antenna is effectively improved, and the usage scenarios of the ultra-wideband antenna are broadened, the user experience is further improved.

Figure 3:
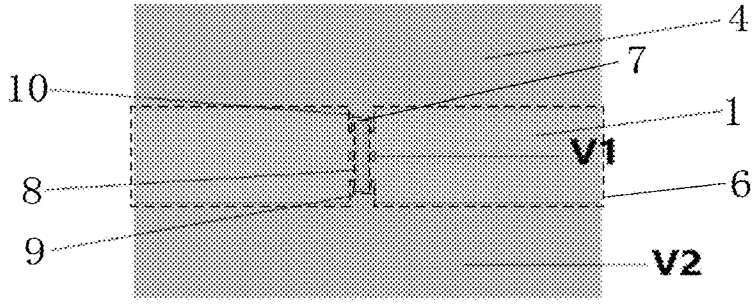
FIG. 3 is a partially enlarged schematic diagram of the switch of the first type of the ultra-wideband antenna according to an embodiment of the present application.
Figure 4:
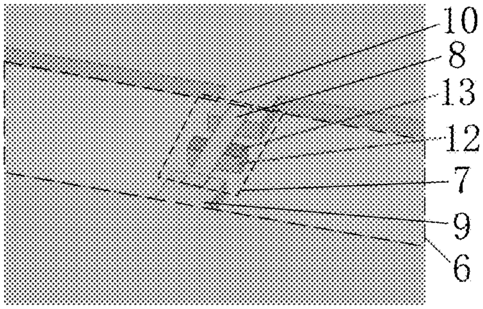
FIG. 4 is a side view of the switch in the on-state in the ultra-wideband antenna according to an embodiment of the present application.

Optionally, referring to FIGS. 3 and 4, an orthographic projection of the switch 7 on the first substrate 1 at least partially overlaps with an orthographic projection of a pattern that formed by an outer contour of the groove 6 on the first substrate 1. The switch 7 is configured to, under the condition of being in an on-state, be capable of controlling the part of the radiating patch 4 that is not penetrated through by the groove 6 to be in the disconnection state, and under the condition of being in an off-state, be capable of controlling the part of the radiating patch 4 that is not penetrated through by the groove 6 to be in the connection state.

The orthographic projection of the switch on the first substrate at least partially overlaps with the orthographic projection of the pattern that formed by the outer contour of the groove on the first substrate above-mentioned refers to that, the orthographic projection of the switch on the first substrate partially overlaps with the orthographic projection of the pattern that formed by the outer contour of the groove on the first substrate, or the orthographic projection of the switch on the first substrate is located within the orthographic projection of the pattern thar formed by the outer contour of the groove on the first substrate. FIG. 4 illustrates by taking the case as an example in which the orthographic projection of the switch 7 on the first substrate 1 is located within the orthographic projection of the pattern that formed by the outer contour of the groove 6 on the first substrate 1.

In the ultra-wideband antenna according to the embodiments of the present application, the part of the radiating patch that is not penetrated through by the groove is controlled to connect or disconnect by controlling the different states of the switch, so that controlling the existence or inexistence of a trapped wave. Particularly, when the switch under the condition of being in the on-state, the radiating patches at both sides of the groove are disconnected; that is, the ultra-wideband antenna has a groove, so that a trapped wave is generated in the ultra-wideband antenna. Moreover, when the switch under the condition of being in the off-state, the radiating patches at both sides of the groove are communicated. That is, the ultra-wideband antenna does not have a groove, so that no trapped wave is generated in the ultra-wideband antenna. In this way, the ultra-wideband antenna that has the characteristic of being capable of reconstructing the trapped wave does not only have the characteristic of a wide broadband, but also may reduce or even avoid mutual interference with communication protocols of other frequency bands during use, the performance of the ultra-wideband antenna is effectively improved, and the usage scenarios of the ultra-wide-band antenna are broadened, the user experience is further improved.

Optionally, in order to simplify the manufacturing process, and reduce the cost, referring to FIG. 4, the orthographic projection of the switch 7 on the first substrate 1 is located within the orthographic projection of the pattern that formed by the outer contour of the groove 6 on the first substrate 1.

Optionally, referring to FIGS. 1, 11, 14, 16 and 18, the orthographic projection of the pattern that formed by the outer contour of the groove 6 on the first substrate 1 is a symmetrical pattern, and the symmetrical pattern is symmetrical about a first symmetry axis (z1 shown in the figure). The orthographic projection of the switch 7 on the first substrate 1 is located on the first symmetry axis z1 of the orthographic projection of the pattern that formed by the outer contour of the groove 6 on the first substrate 1.

FIG. 1 illustrates by taking the case as an example in which the orthographic projection of the pattern that formed by the outer contour of the groove 6 on the first substrate 1 is a U shape, the U-shaped groove is symmetrical about the first symmetry axis z1, and the switch 7 is located in the middle of the groove of the U-shaped groove that is along a direction perpendicular to the first symmetry axis z1, that is, the position of the first symmetry axis z1 is shown as an example.

In the ultra-wideband antenna according to the embodiments of the present application, by configuring the groove to have the symmetrical shape, and providing the switch at the position of the first symmetry axis of the groove, to make the ultra-wideband antenna has a better broadband characteristic, and more excellent performance is obtained, the user experience is better.

Optionally, referring to FIGS. 1, 11, 14, 16 and 18, the wave-trapping unit 5 includes one groove 6, an orthographic projection of a pattern that formed by an outer contour of the groove 6 on the first substrate 1 includes a first sub-part 31, a connecting part 32 and a second sub-part 33, and the first sub-part 31 is communicated to the second sub-part 33 by the connecting part 32. An extension direction of the first sub-part 31 and an extension direction of the second sub-part 33 are both different from an extension direction of the connecting part 32. The orthographic projection of the switch 7 on the first substrate 1 is located on the first symmetry axis z1 of the orthographic projection of the pattern that formed by the outer contour of the connecting part 32 on the first substrate 1.

The first sub-part is communicated to the second sub-part by the connecting part. The connection positions of the connecting part and the first sub-part and the second sub-part are not particularly limited herein. As an example, an end of the connecting part may be communicated to an end of the first sub-part, and the other end of the connecting part may be communicated to an end of the second sub-part. Alternatively, one end of the connecting part may be connected to the geometric center of the first sub-part, and the other end may be connected to the geometric center of the second sub-part. Alternatively, an end of the connecting part may be communicated to a geometric center of the first sub-part, and the other end of the connecting part may be communicated to a geometric center of the second sub-part. Alternatively, an end of the connecting part may be communicated to the geometric center of the first sub-part, and the other end of the connecting part may be communicated to an end of the second sub-part. Certainly, other connection positions may exist, which is decided particularly according to practical applications.

The extension direction of the first sub-part and the extension direction of the second sub-part are both different from the extension direction of the connecting part. The extension direction of the first sub-part and the extension direction of the second sub-part are not particularly limited herein. As an example, the extension direction of the first sub-part and the extension direction of the second sub-part may be the same. Alternatively, the extension direction of the first sub-part and the extension direction of the second sub-part may be different. FIG. 1 illustrates by taking the case as an example in which the extension direction of the first sub-part 31 and the extension direction of the second sub-part 33 are the same, and are all perpendicular to the extension direction of the connecting part 32, and in this case the groove is an U-shaped groove. FIG. 11 illustrates by taking the case as an example in which the extension direction of the first sub-part 31 and the extension direction of the second sub-part 33 are the same, and are all perpendicular to the extension direction of the connecting part 32, and in this case the groove is an H-shaped groove.

In the ultra-wideband antenna according to the embodiments of the present application, the ultra-wideband antenna has a wide broadband and is capable to generate a trapped wave, and a plurality of ultra-wideband antennas of different shapes may be obtained, and further different trapped waves may be obtained according to the different shapes and switches of the grooves in the ultra-wideband antenna, the usage scenarios of the ultra-wideband antenna are broadened, to have a good user experience.

Optionally, referring to FIGS. 1, 11, 14, 16 and 18, the connecting part 32 includes one or more sub-connecting parts, and the first sub-part 31 is communicated to the second sub-part 33 by all of the sub-connecting parts. The extension direction of the first sub-part 31 and the extension direction of the second sub-part 33 are both different from the extension direction of all of the sub-connecting parts. The orthographic projection of the switch 4 on the first substrate 5 is located on the first symmetry axis z1 of the orthographic projection of the pattern that formed by the outer contours of each of the sub-connecting parts on the first substrate 5.

Figure 14:
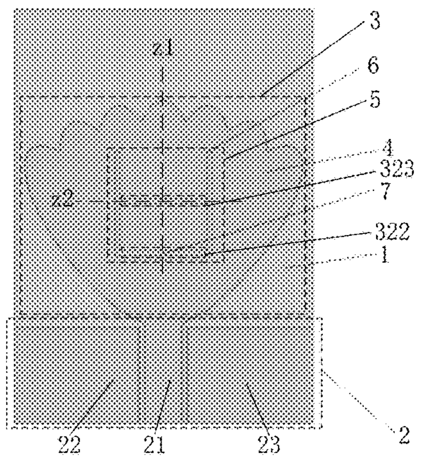
FIG. 14 is a schematic structural diagram of a third type of the ultra-wideband antenna according to an embodiment of the present application.
Figure 16:
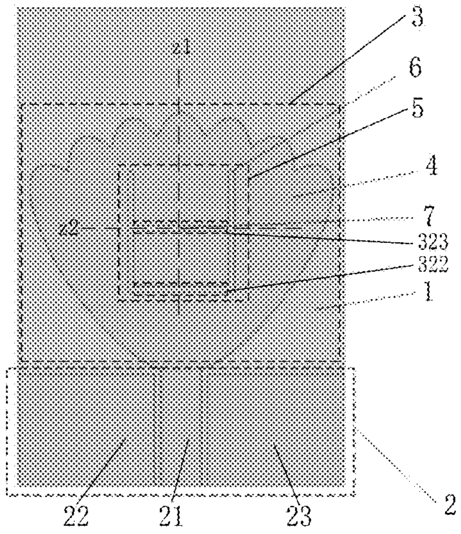
FIG. 16 is a schematic structural diagram of a fourth type of the ultra-wideband antenna according to an embodiment of the present application.
Figure 18:
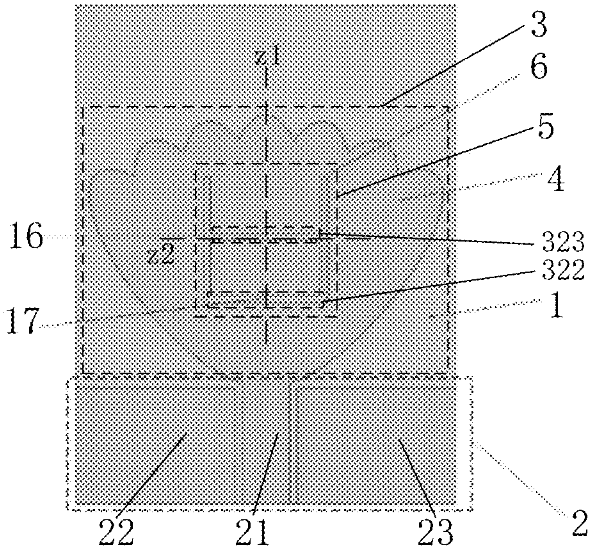
FIG. 18 is a schematic structural diagram of a fifth type of the ultra-wideband antenna according to an embodiment of the present application.

The connecting part includes one or more sub-connecting parts above-mentioned refers to that the connecting part includes one sub-connecting part, or the connecting part includes a plurality of sub-connecting parts, which is decided particularly according to practical applications. Both of FIGS. 1 and 11 illustrate by taking the case as an example in which the connecting part 32 includes one sub-connecting part, that is, a first sub-connecting part 321. All of FIGS. 14, 16 and 18 illustrate by taking the case as an example in which the connecting part 32 includes two sub-connecting parts, which are a second sub-connecting part 322 and a third sub-connecting part 323.

When the connecting part includes a plurality of sub-connecting parts, the extension directions of the sub-connecting parts are not particularly limited. As an example, the extension directions of all of the sub-connecting parts may be the same. Alternatively, the extension directions of all of the sub-connecting parts may all be different. Alternatively, the extension directions of some of the sub-connecting parts may be the same, which is decided particularly according to practical applications. All of FIGS. 14, 16 and 18 illustrate by taking the case as an example in which the extension direction of the second sub-connecting part 322 and the extension direction of the third sub-connecting part 323 are the same.

In the ultra-wideband antenna according to the embodiments of the present application, the ultra-wide-band antenna has a wide broadband and can generate a trapped wave, and multiple types of ultra-wideband antennas of different shapes may be obtained at the same time, and further different trapped waves may be obtained according to the different shapes and switches of the grooves in the ultra-wideband antenna, the usage scenarios of the ultra-wide-band antenna are broadened, to have a good user experience.

Optionally, referring to FIG. 1, the connecting part 32 includes a first sub-connecting part, the extension direction of the first sub-part and the extension direction of the second sub-part 33 are the same, and are all perpendicular to the extension direction of the first sub-connecting part. Both ends of the first sub-connecting part are communicated to an end of the first sub-part 31 and an end of the second sub-part 33 respectively. The orthographic projection of the switch 7 on the first substrate 1 is located on the first symmetry axis z1 of an orthographic projection of the pattern that formed by an outer contour of the first sub-connecting part on the first substrate 1.

Referring to FIG. 1, when the orthographic projection of the pattern that formed by the outer contour of the groove 6 on the first substrate 1 is a U shape, a range of the length of the U-shaped groove may include 25-27 mm. Particularly, the length of the U-shaped groove may be 25 mm, 26 mm, 26.4 mm, 27 mm and so on. A range of the width of the U-shaped groove may include 0.1-0.3 mm. Particularly, the width of the U-shaped groove may be 0.1 mm, 0.15 mm, 0.2 mm, 0.3 mm and so on. The length of the U-shaped groove used herein refers to a sum of the length of the first sub-connecting part, the length from an end of the first sub-part to an connecting end of the first sub-part and the first sub-connecting part in the first sub-part, and the length from an end of the second sub-part to an connecting end of the second sub-part and the first sub-connecting part in the second sub-part, in the U-shaped groove. The width of the U-shaped groove herein refers to the width of the U-shaped groove along the direction of the second symmetry axis z2

Figure 8:
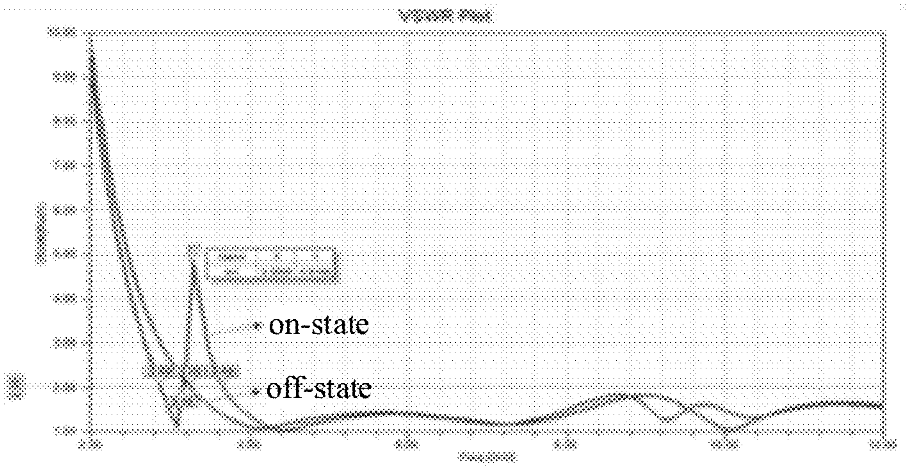
FIG. 8 is a simulation diagram of the ultra-wideband antenna shown in FIG. 1.
Figure 9:
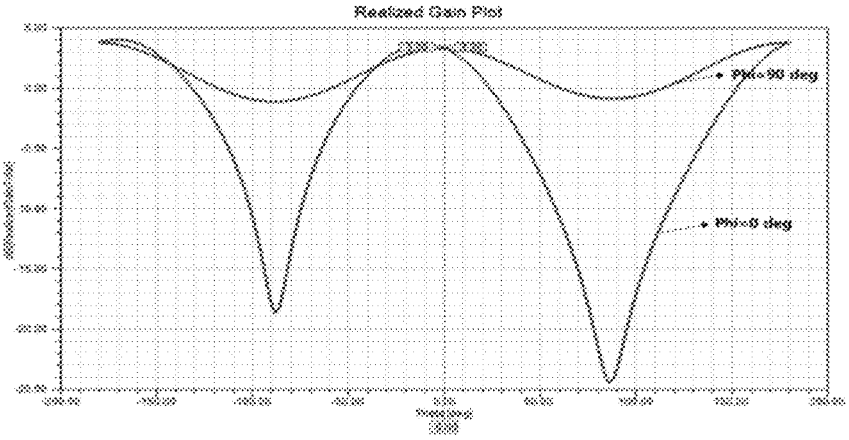
FIG. 9 is a simulation diagram of the switch in the on-state when the ultra-wideband antenna shown in FIG. 1 is at a frequency point of 7 GHz.
Figure 10:
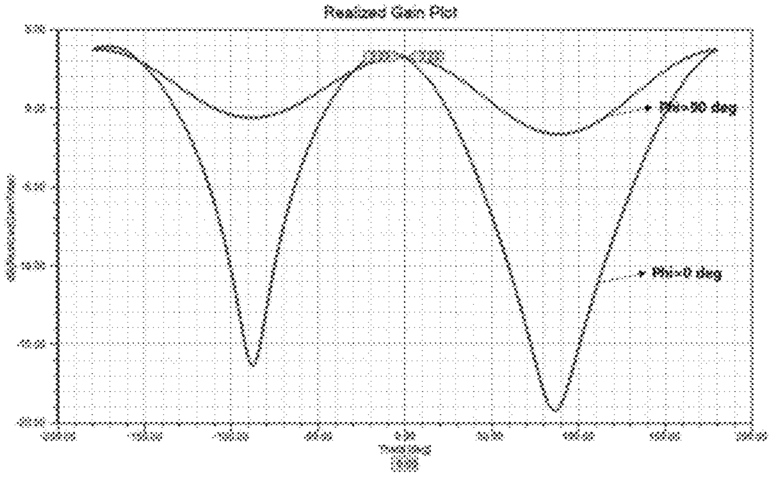
FIG. 10 is a simulation diagram of the switch in the off-state when the ultra-wideband antenna shown in FIG. 1 is at the frequency point of 7 GHz.

Simulation verification is performed to the ultra-wide-band antenna in FIG. 1 according to an embodiment of the present application, to obtain the simulation result of the ultra-wideband antenna in FIG. 1, as shown in FIGS. 8-10.

FIG. 8 shows a curve schematic diagram of the working frequency and a standing-wave ratio of the ultra-wideband antenna. It may be seen from the curve in FIG. 8 that, when the MEMS switch is in the off-state, under the standard that the standing-wave ratio (VSWR) is smaller than or equal to 2, the working frequency of this antenna may cover a frequency band of 3.26-12 GHz, and has the characteristic of ultra wide band, and does not have trapped wave. In this case, the ultra-wideband antenna has a very wide working frequency band, may be applied in multiple types of communication systems, and has a relatively wide application characteristic.

It may be seen from the curve in FIG. 8 that, when the MEMS switch is in the on-state, under the standard that the standing-wave ratio (VSWR) is larger than 2, the working frequency band of this antenna may cover a frequency band of 3.26-12 GHz, and still has the characteristic of ultra wide band. What is different is that, in this case one trapped wave appears in the working frequency band, wherein the frequency band of the trapped wave is 3.16-3.68 GHZ, and the center frequency point of the trapped wave is 3.3 GHZ. In this case, this ultra-wideband antenna has a very wide working frequency band, and may have no mutual interference with a electromagnetic wave having the frequency band of 3.16-3.68 GHZ, so that the performance of the ultra-wideband antenna is ensured.

It should be noted that, the standing-wave ratio above-mentioned is referred to as Voltage Standing Wave Ratio (VSWR), which refers to a ratio of the amplitude of the wave-loop voltage to the wave-trough voltage of a standing wave, and is also referred to as a standing-wave coefficient or a standing-wave ratio. When the standing-wave ratio is equal to 1, it indicates that the impedance of the inputted signal and the impedance of the antenna are completely matched, and in this point, the high-frequency energy is completely radiated out by the antenna, and no reflection loss of the energy exists. When the standing-wave ratio is infinity, it indicates that total reflection, and the energy is completely not radiated out.

FIGS. 9 and 10 show curve schematic diagrams of the gain of the ultra-wideband antenna at a working frequency point of 7 GHz. As may be seen from the curve in FIG. 9, when the MEMS switch is in the on-state, the gain of the ultra-wideband antenna is 3.3 dB. As may be seen from the curve in FIG. 10, when the MEMS switch is in the off-state, the gain of the ultra-wide-band antenna is 3.23 dB. Consequently, the influence of on/off of the MEMS switch on the gain of the antenna is not large.

It should be noted that, the Phi in FIGS. 9 and 10 represents an azimuth angle, and FIGS. 9 and 10 capture the simulation results of two different azimuth angles respectively.

The orientation of the opening of the groove in FIG. 1 may be any direction, and is not particularly limited herein.

In the ultra-wideband antenna according to the embodiments of the present application, the radiating patches at both sides of the groove may be controlled to be connected or disconnected by the provision of the U-shaped groove, the groove of the shape similar to the U-shaped groove and the switch, to control the existence or inexistence of a trapped wave. Particularly, when the switch is in the on-state, the radiating patches at both sides of the groove are disconnected; that is, the ultra-wideband antenna has a groove, so that a trapped wave is generated in the ultra-wideband antenna. Moreover, when the switch is in the off-state, the radiating patches at both sides of the groove are connected; in other words, the ultra-wideband antenna does not have a groove, so that no trapped wave is generated in the ultra-wideband antenna. In this way, the ultra-wideband antenna that has the characteristic of being capable of reconstructing the trapped wave does not only have the characteristic of a wide broadband, but also may reduce or even avoid mutual interference with communication protocols of other frequency bands during use, the performance of the ultra-wideband antenna is effectively improved, and the usage scenarios of the ultra-wideband antenna are broadened, so that the user experience is improved.

Optionally, referring to FIG. 11, the connecting part 32 includes a first sub-connecting part 321, the extension direction of the first sub-part 31 and the extension direction of the second sub-part 33 are the same, and are all perpendicular to the extension direction of the first sub-connecting part 321. Both ends of the first sub-connecting part 321 are communicated to a geometric center of the first sub-part 31 and a geometric center of the second sub-part 33 respectively. The orthographic projection of the switch 7 on the first substrate 1 is located on the first symmetry axis z1 of an orthographic projection of a pattern that formed by tan outer contour of the first sub-connecting part 321 on the first substrate 1.

Both ends of the first sub-connecting part are communicated to the geometric center of the first sub-part and the geometric center of the second sub-part respectively. The geometric center of the first sub-part herein refers to that the first sub-part is symmetrical about this geometric center, and the geometric center of the second sub-part refers to that the second sub-part is symmetrical about this geometric center.

Figure 13:
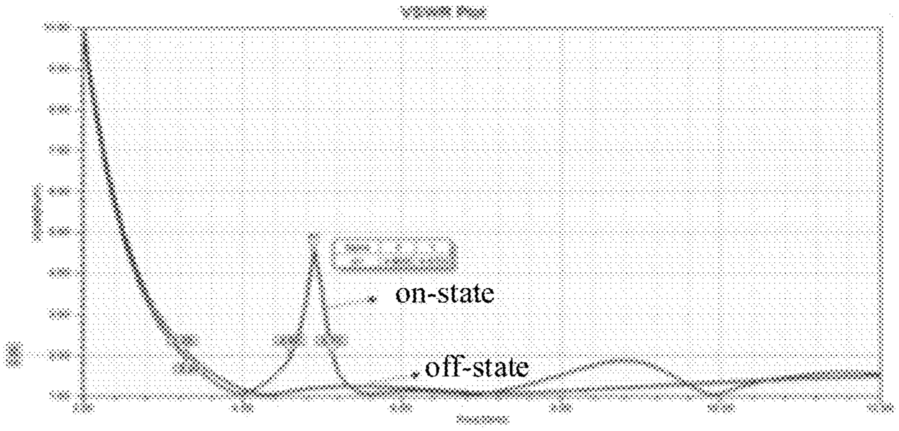
FIG. 13 is a simulation diagram of the ultra-wideband antenna shown in FIG. 11.

Simulation verification is performed to the ultra-wideband antenna in FIG. 11 according to an embodiment of the present application, to obtain the simulation result of the ultra-wideband antenna in FIG. 11, as shown in FIG. 13.

FIG. 13 shows a curve schematic diagram of the working frequency and the standing-wave ratio of the ultra-wideband antenna. As may be seen from the curve in FIG. 13, when the MEMS switch is in the off-state, under the standard that the standing-wave ratio (VSWR) is smaller than or equal to 2, the working frequency of the antenna may cover a frequency band of 3.34-12 GHz, and has the characteristic of ultra wide band, and has no trapped wave. In this case, the ultra-wideband antenna has a very wide working frequency band, may be applied to multiple types of communication systems, and has a relatively wide application characteristic.

As may be seen from the curve in FIG. 13, when the MEMS switch is in the on-state, under the standard that the standing-wave ratio (VSWR) is larger than 2, the working frequency band of the antenna may cover a frequency band of 3.34-12 GHz, and still has the characteristic of ultra wide band. What is different is that, in this case one trapped wave appears in the working frequency band, wherein the frequency band of the trapped wave is 4.6-5.13 GHZ, and the center frequency point of the trapped wave is 4.9 GHz. In this case, the ultra-wideband antenna has a very wide working frequency band, and may have no mutual interference with the electromagnetic wave having the frequency band of 4.6-5.13 GHZ, and the performance of the ultra-wideband antenna is ensured.

In the ultra-wideband antenna according to the embodiments of the present application, the radiating patches at both sides of the groove may be controlled to be connected or disconnected by the provision of the H-shaped groove, the groove of the shape similar to the H-shaped groove and the switch, so that the existence or inexistence of a trapped wave is controlled. Particularly, when the switch is in the on-state, the radiating patches at both sides of the groove are disconnected; in other words, the ultra-wideband antenna has a groove, so that a trapped wave is generated in the ultra-wideband antenna. Moreover, when the switch is in the off-state, the radiating patches at both sides of the groove are connected; in other words, the ultra-wideband antenna does not have a groove, so that no trapped wave is generated in the ultra-wideband antenna. In this way, the ultra-wideband antenna that has the characteristic of being capable of reconstructing the trapped wave does not only have the characteristic of a wide broadband, but also may reduce or even prevent mutual interference with communication protocols of other frequency bands during use, the performance of the ultra-wide-band antenna is effectively improved, and the usage scenarios of the ultra-wide-band antenna are broadened, so that the user experience is improved.

Furthermore, by comparing the performance of the ultra-wideband antenna shown in FIG. 11 and the performance of the ultra-wideband antenna shown in FIG. 1, it is found that, when the switch is in the on-state, although all of the ultra-wideband antennas generate a trapped wave, the trapped waves generated by different structures have different frequency bands. This is because the different setting positions of the first sub-connecting part form the grooves having different lengths. Since the length of the groove is the sum of the length of the first sub-connecting part, the length from an end of the first sub-part to a connecting end of the first sub-part and the first sub-connecting part in the first sub-part, and the length from an end of the second sub-part to a connecting end of the second sub-part and the first sub-connecting part in the second sub-part, the length of the groove in FIG. 11 is a sum of a half of the length of the first sub-part, the length of the first sub-connecting part and a half of the length of the second sub-part, which is definitely less than the length of the groove in FIG. 1, so that trapped waves of different frequency bands is obtained.

Optionally, the wave-trapping unit is configured to also be capable of controlling a frequency band in the working frequency band of the ultra-wideband antenna that having a trapped wave.

In the ultra-wideband wave-trapping antennas of the related art, generally, after the design is completed, the frequency band of the trapped wave is fixed and constant. In order to select the required trapped-wave frequency band according to the practical communication frequency band, the embodiments of the present application provide a novel ultra-wideband antenna, wherein the ultra-wideband antenna may control the frequency band in the working frequency band of the ultra-wideband antenna that having the trapped wave, and the required trapped-wave frequency band may be selected according to the practical communication frequency band, to have a good user experience.

Optionally, referring to FIG. 14, the connecting part 32 includes a second sub-connecting part 322 and a third sub-connecting part 323, the extension direction of the first sub-part 31 and the extension direction of the second sub-part 33 are the same, the extension direction of the second sub-connecting part 322 and the extension direction of the third sub-connecting part 323 are the same, and the extension direction of the first sub-part 31 is perpendicular to the extension direction of the second sub-connecting part 322. Both ends of the second sub-connecting part 322 are communicated to an end of the first sub-part 31 and an end of the second sub-part 33 respectively, and both ends of the third sub-connecting part 323 are communicated to a geometric center of the first sub-part 31 and a geometric center of the second sub-part 33. The orthographic projection of the switch 7 on the first substrate 1 is located on the first symmetry axis z1 of an orthographic projection of the pattern that formed by an outer contour of the second sub-connecting part 322 on the first substrate 1.

Figure 15:
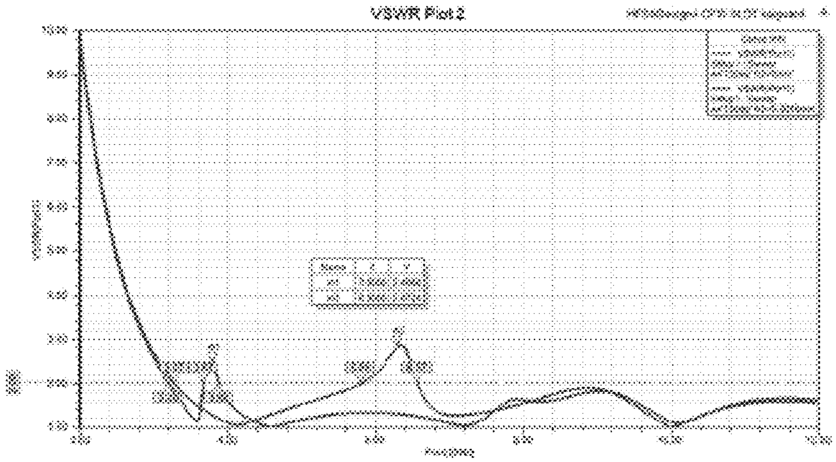
FIG. 15 is a simulation diagram of the ultra-wideband antenna shown in FIG. 14.

Simulation verification is performed to the ultra-wide-band antenna shown in FIG. 14 according to an embodiment of the present application, to obtain the simulation result of the ultra-wideband antenna shown in FIG. 14, as shown in FIG. 15.

FIG. 15 shows a curve schematic diagram of the working frequency and the standing-wave ratio of the ultra-wideband antenna. As may be seen from the curve in FIG. 15, when the MEMS switch is in the on-state, under the standard that the standing-wave ratio (VSWR) is larger than 2, the working frequency band of the antenna may cover a frequency band of 3.27-12 GHz, and still has the characteristic of ultra wide band. Furthermore, one trapped wave appears in the working frequency band, wherein the frequency band of the trapped wave is 5.8-6.57 GHz, and the center frequency point of the trapped wave is 6.3 GHz. The ultra-wideband antenna has a very wide working frequency band, and may have no mutual interference with the electromagnetic wave having the frequency band of 5.8-6.57 GHz, the performance of the ultra-wide-band antenna is ensured.

As also may be seen from the curve in FIG. 15, when the MEMS switch is in the off-state, under the standard that the standing-wave ratio (VSWR) is larger than 2, the working frequency of the antenna may cover a frequency band of 3.27-12 GHz, and has the characteristic of ultra wide band. Furthermore, the working frequency band still has a trapped wave, but the frequency band of the trapped wave is migrated to 3.67-3.88 GHZ, and the center frequency point is changed to 3.8 GHz. The ultra-wideband antenna has a very wide working frequency band, and may have no mutual interference with the electromagnetic wave having the frequency band of 3.67-3.88 GHz, so that the performance of the ultra-wide-band antenna is ensured.

In the ultra-wideband antenna according to the embodiments of the present application, the grooves of different lengths may be obtained by the provision of a inversed A-shaped groove, a groove having a shape similar to the inversed A-shaped groove and the switch, so that controlling the existence or inexistence of a trapped wave by controlling the communication or disconnection of the radiating patches at both sides of the groove. Particularly, referring to FIG. 14, since the switch 7 is located on the first symmetry axis z1 of the orthographic projection of the pattern that formed by the outer contour of the second sub-connecting part 322 on the first substrate 1, when the switch 7 is in the off-state, the length of the groove is a sum of the length of the third sub-connecting part 323, a half of the length of the first sub-part 31 and a half of the length of the second sub-part 33. When the switch 7 is in the on-state, the length of the groove is a sum of the length of the second sub-connecting part 322, the length of the first sub-part 31 and the length of the second sub-part 33. In other words, the radiating patches at both sides of the groove is controlled to be connected or disconnected by opening or closing the switch, so that controlling the existence or inexistence and the frequency band of the trapped wave. Therefore, the ultra-wideband antenna that has the characteristic of being capable of reconstructing the trapped wave does not only have the characteristic of a wide broadband, but also may reduce or even prevent mutual interference with various communication protocols of other frequency bands during use, the performance of the ultra-wide-band antenna is effectively improved, and the usage scenarios of the ultra-wide-band antenna are broadened, so that the user experience is improved.

Alternatively, referring to FIG. 16, the connecting part 32 includes a second sub-connecting part 322 and a third sub-connecting part 323, the extension direction of the first sub-part 31 and the extension direction of the second sub-part 33 are the same, the extension direction of the second sub-connecting part 322 and the extension direction of the third sub-connecting part 323 are the same, and the extension direction of the first sub-part 31 is perpendicular to the extension direction of the second sub-connecting part 322. Both ends of the second sub-connecting part 322 are communicated to an end of the first sub-part 31 and an end 20) of the second sub-part 33 respectively, and both ends of the third sub-connecting part 323 are communicated to a geometric center of the first sub-part 31 and a geometric center of the second sub-part 33 respectively. The orthographic projection of the switch 7 on the first substrate 1 is located on the first symmetry axis z1 of an orthographic projection of a pattern that formed by an outer contour of the third sub-connecting part 323 on the first substrate 1.

Figure 17:
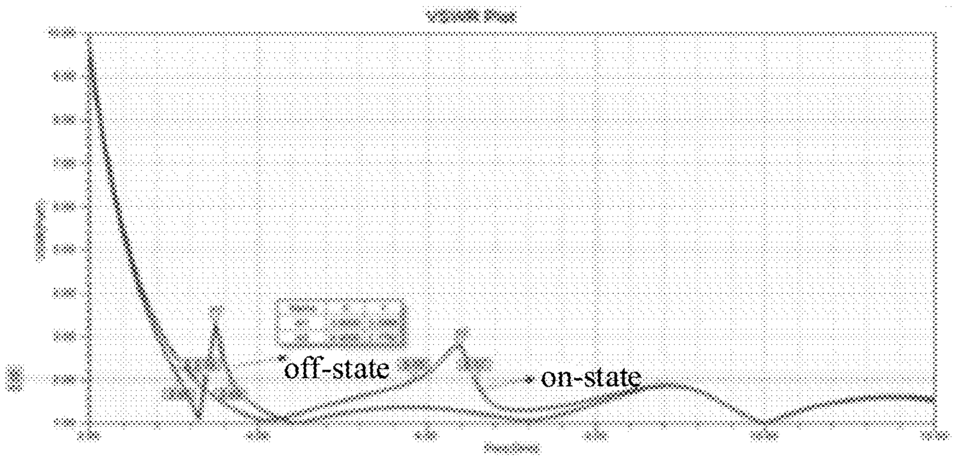
FIG. 17 is a simulation diagram of the ultra-wideband antenna shown in FIG. 16.

Simulation verification is performed to the ultra-wideband antenna shown in FIG. 16 according to an embodiment of the present application, to obtain the simulation result of the ultra-wideband antenna shown in FIG. 16, as shown in FIG. 17.

FIG. 17 shows a curve schematic diagram of the working frequency and the standing-wave ratio of the ultra-wideband antenna. As also may be seen from the curve in FIG. 17, when the MEMS switch is in the on-state, under the standard that the standing-wave ratio (VSWR) is larger than 2, the working frequency band of the antenna may cover a frequency band of 3.26-12 GHz, and still has the characteristic of ultra wide band. Furthermore, one trapped wave appears in the working frequency band, wherein the frequency band of the trapped wave is 5.85-6.57 GHz, and the center frequency point of the trapped wave is 6.4 GHz. The ultra-wideband antenna has a very wide working frequency band, and may have no mutual interference with the electromagnetic wave having the frequency band of 5.85-6.57 GHz, so that the performance of the ultra-wide-band antenna is ensured.

As also may be seen from the curve in FIG. 17, when the MEMS switch is in the off-state, under the standard that the standing-wave ratio (VSWR) is larger than 2, the working frequency of the antenna may cover a frequency band of 3.26-12 GHz, and has the characteristic of ultra wide band. Furthermore, the working frequency band still has a trapped wave, but the frequency band of the trapped wave is migrated to 3.38-3.69 GHZ, and the center frequency point is changed to 3.5 GHz. The ultra-wideband antenna has a very wide working frequency band, and may have no mutual interference with the electromagnetic wave of the frequency band of 3.67-3.88 GHz, the performance of the ultra-wideband antenna is ensured.

It should be noted that, the connecting part may further include three or more sub-connecting parts, whereby the grooves of different lengths may be realized by configuring the different positions of more sub-connecting parts, to realize the reconstruction values of more trapped-wave frequencies, and the regulation span may also be controlled accordingly.

The upright A-shaped groove has the effect similar to that of the inversed A-shaped groove, which is not discussed further herein.

In the ultra-wideband antenna according to the embodiments of the present application, the grooves of different lengths may be obtained by the provision of the inversed A-shaped groove, the groove of a shape similar to the inversed A-shaped groove and the switch, so that controlling the existence or inexistence of a trapped wave by controlling the communication or disconnection of the radiating patches at both sides of the groove. Particularly, referring to FIG. 16, since the switch 7 is located on the first symmetry axis z1 of the orthographic projection of the pattern enclosed by the outer contour of the third sub-connecting part 323 on the first substrate 1, when the switch 7 is in the off-state, the length of the groove is the sum of the length of the second sub-connecting part 322, the length of the first sub-part 31 and the length of the second sub-part 33. When the switch 7 is in the on-state, the length of the groove is the sum of the length of the third sub-connecting part 323, a half of the length of the first sub-part 31 and a half of the length of the second sub-part 33. In other words, the radiating patches at both sides of the groove is controlled to connect or disconnect by opening or closing the switch, so that controlling the existence or inexistence and the frequency band of the trapped wave. Consequently, the ultra-wideband antenna that has the characteristic of being capable of reconstructing the trapped wave does not only have the characteristic of a wide broadband, but also may reduce or even prevent mutual interference with various communication protocols of other frequency bands during use, the performance of the ultra-wideband antenna is effectively improved, and the usage scenarios of the ultra-wideband antenna are broadened, the user experience is improved.

Optionally, referring to FIG. 18, the connecting part 32 includes a second sub-connecting part 322 and a third sub-connecting part 323, the extension direction of the first sub-part 31 and the extension direction of the second sub-part 33 are the same, and an extension direction of the second sub-connecting part 322 and an extension direction of the third sub-connecting part 323 are the same, and the extension direction of the first sub-part 31 is perpendicular to the extension direction of the second sub-connecting part 322. Both ends of the second sub-connecting part 322 are communicated to an end of the first sub-part 31 and an end of the second sub-part 33 respectively, and both ends of the third sub-connecting part 323 are communicated to a geometric center of the first sub-part 31 and a geometric center of the second sub-part 33 respectively. The switch 7 includes a first switch 16 and a second switch 17, and an orthographic projection of the first switch 16 on the first substrate 1 is located on the first symmetry axis z1 of an orthographic projection of a pattern that formed by an outer contour of the third sub-connecting part 323 on the first substrate 1. An orthographic projection of the second switch 17 on the first substrate 1 is located on the first symmetry axis z1 of an orthographic projection of a pattern that formed by an outer contour of the second sub-connecting part 322 on the first substrate 1.

Figure 20:
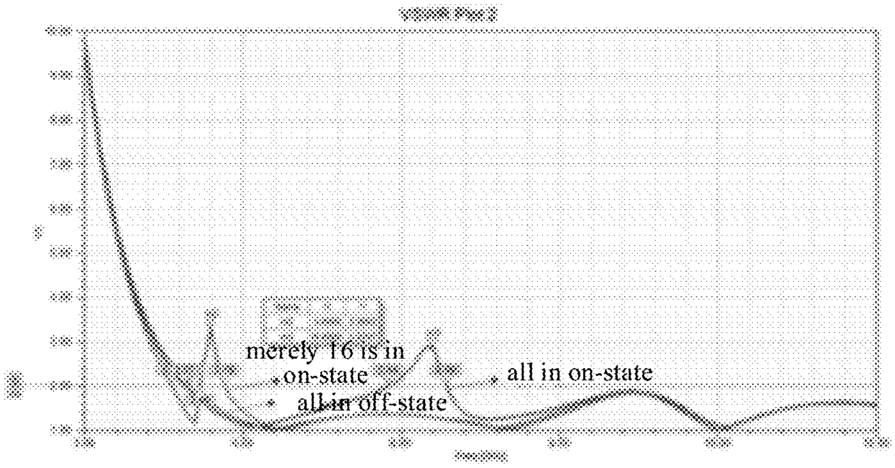
FIG. 20 is a simulation diagram of the ultra-wideband antenna shown in FIG. 18.

Simulation verification is performed to the ultra-wideband antenna shown in FIG. 18 according to an embodiment of the present application, to obtain the simulation result of the ultra-wideband antenna shown in FIG. 18, as shown in FIG. 20.

FIG. 20 shows a curve schematic diagram of the working frequency and the standing-wave ratio of the ultra-wideband antenna. As may be seen from the curve in FIG. 20, when both of the two MEMS switches are in the off-state, under the standard that the standing-wave ratio (VSWR) is smaller than or equal to 2, the working frequency of the antenna may cover a frequency band of 3.33-12 GHz, and it has the characteristic of ultra wide band, and has no trapped wave. In this case, the ultra-wideband antenna has a very wide working frequency band, may be applied to multiple types of communication systems, and has a relatively wide application.

As also may be seen from the curve in FIG. 20, when both of the two MEMS switches are in the on-state, under the standard that the standing-wave ratio (VSWR) is larger than 2, the working frequency band of the antenna may cover a frequency band of 3.33-12 GHz, and still has the characteristic of ultra wide band. Furthermore, one trapped wave appears in the working frequency band, wherein the frequency band of the trapped wave is 5.84-6.58 GHZ, and the center frequency point of the trapped wave is 6.4 GHz. The ultra-wideband antenna has a very wide working frequency band, and may have no mutual interference with the electromagnetic wave having the frequency band of 5.84-6.58 GHZ, the performance of the ultra-wideband antenna is ensured.

As also may be seen from the curve in FIG. 20, when the first switch 16 is in the on-state and the second switch 17 is in the off-state, under the standard that the standing-wave ratio (VSWR) is larger than 2, the working frequency of the antenna may cover a frequency band of 3.33-12 GHz, and has the characteristic of ultra wide band. Furthermore, one trapped wave appears in the working frequency band, wherein the frequency band of the trapped wave is 3.46-3.78 GHz, and the center frequency point of the trapped wave is 3.6 GHz. The ultra-wideband antenna has a very wide working frequency band, and may have no mutual interference with the electromagnetic wave having the frequency band of 3.46-3.78 GHZ, the performance of the ultra-wideband antenna is ensured.

It should be noted that, the connecting part may further include three or more sub-connecting parts, so that the grooves of different lengths may be realized by configuring the different positions of more sub-connecting parts, to realize the reconstructed values of more trapped-wave frequencies, and the regulation span may also be controlled accordingly.

The upright A-shaped groove has the effect similar to that of the inversed A-shaped groove, which is not discussed further herein.

It may also be controlled that the first switch 16 is in the off-state and the second switch 17 is in the on-state, and so on, which is not discussed further herein.

In the ultra-wideband antenna according to the embodiments of the present application, the grooves of different lengths may be obtained by the provision of the inversed A-shaped groove, the groove of a shape similar to the inversed A-shaped groove and the switch, so that controlling the existence or inexistence of a trapped wave by controlling the communication or disconnection of the radiating patches at both sides of the groove. Particularly, referring to FIG. 18, since the first switch 16 is located on the first symmetry axis z1 of the orthographic projection of the pattern that formed by the outer contour of the third sub-connecting part 323 on the first substrate 1, and the second switch 17 is located on the first symmetry axis z1 of the orthographic projection of the pattern that formed by the outer contour of the second sub-connecting part 322 on the first substrate 1, when both of the first switch 16 and the second switch 17 are in the off-state, no trapped wave is generated. When both of the first switch 16 and the second switch 17 are in the on-state, a single trapped wave is generated. When the first switch 16 is in the on-state and the second switch 17 is in the off-state, a single trapped wave is generated. Accordingly, the existence or inexistence and the frequency band of the trapped wave may be controlled by the cooperation between the states of the first switch and the second switch. Consequently, the ultra-wideband antenna that has the characteristic of being capable of reconstructing the trapped wave does not only have the characteristic of a wide broadband, but also may reduce or even prevent mutual interference with various communication protocols of other frequency bands during use, the performance of the ultra-wide-band antenna is effectively improved, and the usage scenarios of the ultra-wide-band antenna are broadened, the user experience is improved.

Optionally, the wave-trapping unit is configured to be capable of controlling a number of trapped waves that appear in the working frequency band of the ultra-wideband antenna.

In the ultra-wideband wave-trapping antennas of the related art, generally, after the design is completed, the number of the trapped wave is fixed and constant. In order to select the required frequency band and number of the trapped waves according to the practical communication frequency band, the embodiments of the present application provide a novel ultra-wideband antenna, wherein the ultra-wideband antenna may control the number of the trapped waves that appear in the working frequency band of the ultra-wideband antenna, and so that the required frequency band and number of the trapped waves may be selected according to the practical communication frequency band, to have a good user experience.

Figure 21:
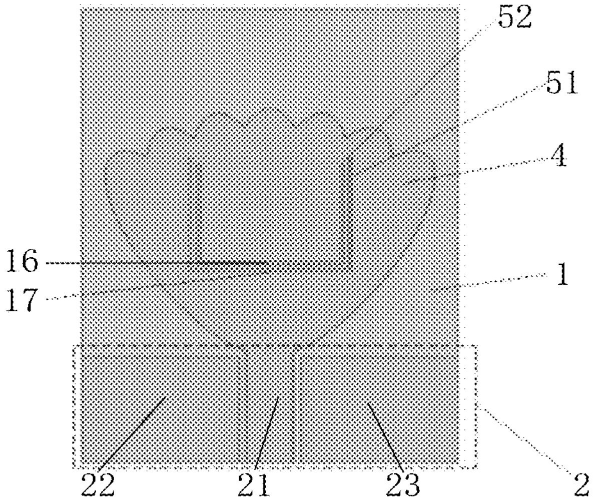
FIG. 21 is a schematic structural diagram of a sixth type of the ultra-wideband antenna according to an embodiment of the present application.
Figure 24:
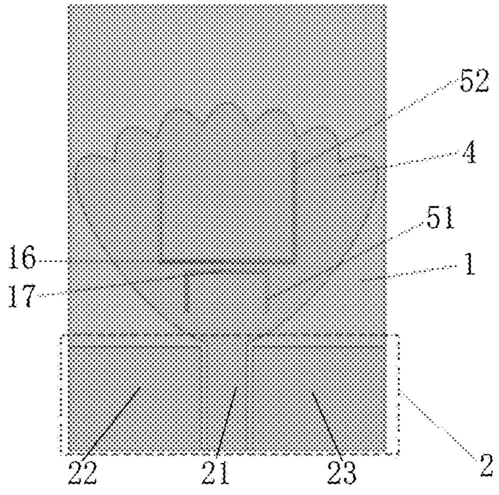
FIG. 24 is a schematic structural diagram of a seventh type of the ultra-wideband antenna according to an embodiment of the present application.

Optionally, referring to FIGS. 21 and 24, the wave-trapping unit 5 includes a first groove 51 and a second groove 52, and a length of an orthographic projection of an outer contour of the first groove 51 on the first substrate 1 is different from a length of an orthographic projection of an outer contour of the second groove 52 on the first substrate 1.

The switch 7 includes a first switch 16 and a second switch 17, and an orthographic projection of the first switch 16 on the first substrate 1 is located on the first symmetry axis z1 of an orthographic projection of a pattern that formed by an outer contour of the second groove 52 on the first substrate 1. An orthographic projection of the second switch 17 on the first substrate 1 is located on the first symmetry axis z1 of an orthographic projection of a pattern that formed by an outer contour of the first groove 51 on the first substrate 1.

The shape relationship, the opening direction relationship and the like of the first groove and the second groove are all not particularly limited herein. As an example, the shapes of the first groove and the second groove may be the same. Alternatively, the shapes of the first groove and the second groove may be different. As an example, the opening directions of the first groove and the second groove may be the same. Alternatively, the opening directions of the first groove and the second groove may be different. Those are decided particularly according to practical applications.

It should be noted that, the wave-trapping unit may also include three or more grooves. Regarding three or more grooves, the lengths of the orthographic projections on the first substrate of the outer contours of each of the grooves are not particularly limited herein. As an example, the lengths of the orthographic projections of the outer contours of all of the grooves on the first substrate may be the same. Alternatively, the lengths of the orthographic projections of the outer contours of all of the grooves on the first substrate may be different. Alternatively, the lengths of the orthographic projections of the outer contours of some of the grooves on the first substrate may be the same, which is decided particularly according to practical applications.

The spacing between the first groove and the second groove should not be excessively large, to ensure the performance of the ultra-wideband antenna.

Certainly, the length of the orthographic projection of the outer contour of the first groove on the first substrate and the length of the orthographic projection of the outer contour of the second groove on the first substrate may also be the same, and in this case different trapped waves cannot be generated.

In the ultra-wideband antenna according to the embodiments of the present application, by configuring that the length of the first groove and the length of the second groove are different, various trapped waves may be generated. Particularly, when the length of the orthographic projection of the outer contour of the first groove on the first substrate and the length of the orthographic projection of the outer contour of the second groove on the first substrate have a large difference therebetween, trapped-wave regulation of a large span frequency band may be realized, for example, adjusting from 3 GHz to 10 GHz. When the length of the orthographic projection of the outer contour of the first groove on the first substrate and the length of the orthographic projection of the outer contour of the second groove on the first substrate have a small difference therebetween, trapped-wave regulation of a small span frequency band may be realized, for example, adjusting from 3 GHz to 3.5 GHz. In this way, the ultra-wideband antenna that has the characteristic of being capable of reconstructing the trapped wave does not only have the characteristic of a wide broadband, but also may reduce or even prevent mutual interference with various communication protocols of other frequency bands during use, the performance of the ultra-wideband antenna is effectively improved, and the usage scenarios of the ultra-wideband antenna are broadened, so that the user experience is improved.

Optionally, referring to FIG. 21, the length of the orthographic projection on the first substrate 1 of the outer contour of the first groove 51 is larger than the length of the orthographic projection of the outer contour of the second groove 52 on the first substrate 1, an opening direction of the first groove 51 and the opening direction of the second groove 52 are the same, and the second groove 52 is nested in the first groove 51, and is spaced apart from the first groove.

A range of the length of the orthographic projection of the outer contour of the first groove on the first substrate is not particularly limited herein. As an example, the range of the length of the orthographic projection of the outer contour of the first groove on the first substrate may include 25-27 mm. Particularly, the length of the orthographic projection of the outer contour of the first groove on the first substrate may be 25 mm, 26 mm, 26.4 mm, 27 mm and so on.

A range of the width of the orthographic projection of the outer contour of the first groove on the first substrate is not particularly limited herein. As an example, the range of the width of the orthographic projection of the outer contour of the first groove on the first substrate may include 0.1-0.3 mm. Particularly, the width of the orthographic projection of the outer contour of the first groove on the first substrate may be 0.1 mm, 0.15 mm, 0.2 mm, 0.3 mm and so on.

A range of the length of the orthographic projection of the outer contour of the second groove on the first substrate is not particularly limited herein. As an example, the range of the length of the orthographic projection of the outer contour of the second groove on the first substrate may include 22-24 mm. Particularly, the length of the orthographic projection of the outer contour of the second groove on the first substrate may be 22 mm, 23 mm, 23.4 mm, 24 mm and so on.

A range of the width of the orthographic projection of the outer contour of the second groove on the first substrate is not particularly limited herein. As an example, the range of the width of the orthographic projection of the outer contour of the second groove on the first substrate may include 0.1-0.3 mm. Particularly, the width of the orthographic projection of the outer contour of the second groove on the first substrate may be 0.1 mm, 0.15 mm, 0.2 mm, 0.3 mm and so on.

A range of the spacing between the first groove and the second groove is not particularly limited herein. As an example, the range of the spacing between the first groove and the second groove may include 0.2-0.4 mm. Particularly, the spacing between the first groove and the second groove may be 0.2 mm, 0.3 mm, 0.4 mm and so on.

Figure 23:
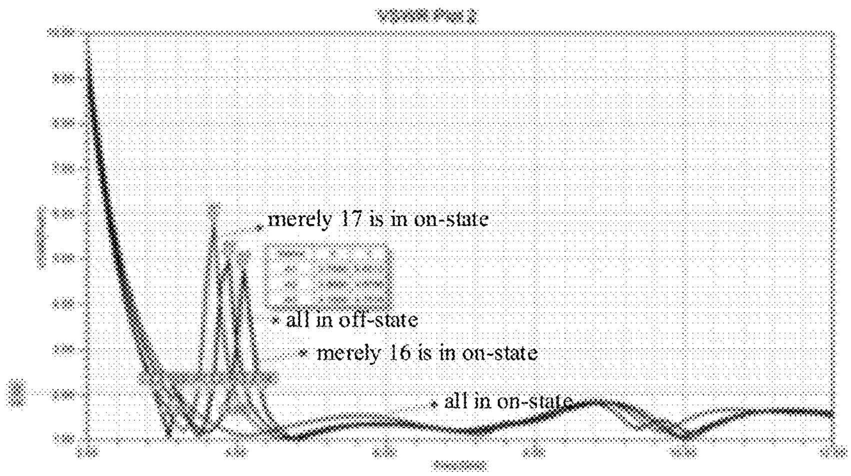
FIG. 23 is a simulation diagram of the ultra-wideband antenna shown in FIG. 21.

Simulation verification is performed to the ultra-wideband antenna shown in FIG. 21 according to an embodiment of the present application, to obtain the simulation result of the ultra-wideband antenna shown in FIG. 21, as shown in FIG. 23.

FIG. 23 shows a curve schematic diagram of the working frequency and the standing-wave ratio of the ultra-wideband antenna. As also may be seen from the curve in FIG. 23, when both of the two MEMS switches (the first switch 16 and the second switch 17) are in the on-state, under the standard that the standing-wave ratio (VSWR) is larger than 2, the working frequency band of the antenna may cover a frequency band of 3.23-12 GHz, and still has the characteristic of ultra wide band. Furthermore, one trapped wave appears in the working frequency band, wherein the frequency band of the trapped wave is 3.67-4.16 GHZ, and the center frequency point of the trapped wave is 3.9 GHZ. The ultra-wideband antenna has a very wide working frequency band, and may have no mutual interference with the electromagnetic wave of the frequency band of 3.67-4.16 GHZ, the performance of the ultra-wide-band antenna is ensured.

As also may be seen from the curve in FIG. 23, when both of the two MEMS switches are in the off-state, under the standard that the standing-wave ratio (VSWR) is smaller than or equal to 2, the working frequency of the antenna may cover a frequency band of 3.23-12 GHZ, and has the characteristic of ultra wide band, and does not have a trapped wave. In this case, the ultra-wideband antenna has a very wide working frequency band, may be applied in multiple types of communication systems, and has a relatively wide application.

As also may be seen from the curve in FIG. 23, when the first switch 16 is in the off-state and the second switch 17 is in the on-state, under the standard that the standing-wave ratio (VSWR) is larger than 2, the working frequency of the antenna may cover a frequency band of 3.23-12 GHz, and has the characteristic of ultra wide band. Furthermore, one trapped wave appears in the working frequency band, wherein the frequency band of the trapped wave is 3.47-4 GHz, and the center frequency point of the trapped wave is 3.7 GHZ. The ultra-wideband antenna has a very wide working frequency band, and may have no mutual interference with the electromagnetic wave of the frequency band of 3.47-4 GHZ, the performance of the ultra-wide-band antenna is ensured.

As also may be seen from the curve in FIG. 23, when the first switch 16 is in the on-state and the second switch 17 is in the off-state, under the standard that the standing-wave ratio (VSWR) is larger than 2, the working frequency of the antenna may cover a frequency band of 3.23-12 GHz, and has the characteristic of ultra wide band. Furthermore, one trapped wave appears in the working frequency band, wherein the frequency band of the trapped wave is 3.90-4.34 GHZ, and the center frequency point of the trapped wave is 4.1 GHZ. The ultra-wideband antenna has a very wide working frequency band, and may have no mutual interference with the electromagnetic wave of the frequency band of 3.90-4.34 GHZ, the performance of the ultra-wide-band antenna is ensured.

It should be noted that, the wave-trapping unit may also include three or more grooves. Regarding three or more grooves, the opening directions of the grooves are not particularly limited herein. As an example, the opening directions of all of the grooves may be the same. Alternatively, the opening directions of some of the grooves may be the same, which is decided particularly according to practical applications.

In the ultra-wideband antenna according to the embodiments of the present application, by configuring that the opening directions of the first groove and the second groove are the same, that is, the wave-trapping unit is a co-directional opening double groove, for example, a co-directional opening double U-shaped groove shown in FIG. 21. On this basis, in combination with the design of the first switch 16 and the second switch 17, large span reconstruction/small span reconstruction of multiple trapped-wave frequencies may be realized. Consequently, so that reducing or even preventing mutual interference with communication protocols of various other frequency bands during use, the performance of the ultra-wideband antenna is effectively improved, and the usage scenarios of the ultra-wide-band antenna are broadened, so that the user experience is improved.

Optionally, referring to FIG. 24, an opening direction of the first groove 51 is opposite to an opening direction of the second groove 52, and the first groove 51 and the second groove 52 are spaced apart from each other.

The relation between the length of the first groove and the length of the second groove is not particularly limited herein. As an example, the length of the orthographic projection of the outer contour of the first groove on the first substrate may be larger than the length of the orthographic projection of the outer contour of the second groove on the first substrate. Alternatively, the length of the orthographic projection of the outer contour of the first groove on the first substrate may be smaller than the length of the orthographic projection of the outer contour of the second groove on the first substrate.

FIG. 24 illustrates by taking the case as an example in which the length of the orthographic projection of the outer contour of the first groove 51 on the first substrate 1 is less than the length of the orthographic projection of the outer contour of the second groove 52 on the first substrate 1. A range of the length of the orthographic projection of the outer contour of the first groove on the first substrate is not particularly limited herein. As an example, the range of the length of the orthographic projection of the outer contour of the first groove on the first substrate may include 11-14 mm. Particularly, the length of the orthographic projection of the outer contour of the first groove on the first substrate may be 11 mm, 12 mm, 12.4 mm, 14 mm and so on. The range of the length of the orthographic projection of the outer contour of the second groove on the first substrate is not particularly limited herein. As an example, the range of the length of the orthographic projection of the outer contour of the second groove on the first substrate may include 25-27 mm. Particularly, the length of the orthographic projection of the outer contour of the second groove on the first substrate may be 25 mm, 26 mm, 26.4 mm, 27 mm and so on.

A range of the width of the orthographic projection of the outer contour of the first groove on the first substrate is not particularly limited herein. As an example, the range of the width of the orthographic projection of the outer contour of the first groove on the first substrate may include 0.1-0.3 mm. Particularly, the width of the orthographic projection of the outer contour of the first groove on the first substrate may be 0.1 mm, 0.15 mm, 0.2 mm, 0.3 mm and so on.

A range of the width of the orthographic projection of the outer contour of the second groove on the first substrate is not particularly limited herein. As an example, the range of the width of the orthographic projection of the outer contour of the second groove on the first substrate may include 0.1-0.3 mm. Particularly, the width of the orthographic projection of the outer contour of the second groove on the first substrate may be 0.1 mm, 0.15 mm, 0.2 mm, 0.3 mm and so on.

A range of the spacing between the first groove and the second groove is not particularly limited herein. As an example, the range of the spacing between the first groove and the second groove may include 0.3-0.6 mm. Particularly, the spacing between the first groove and the second groove may be 0.3 mm, 0.4 mm, 0.5 mm, 0.6 mm and so on.

Figure 25:
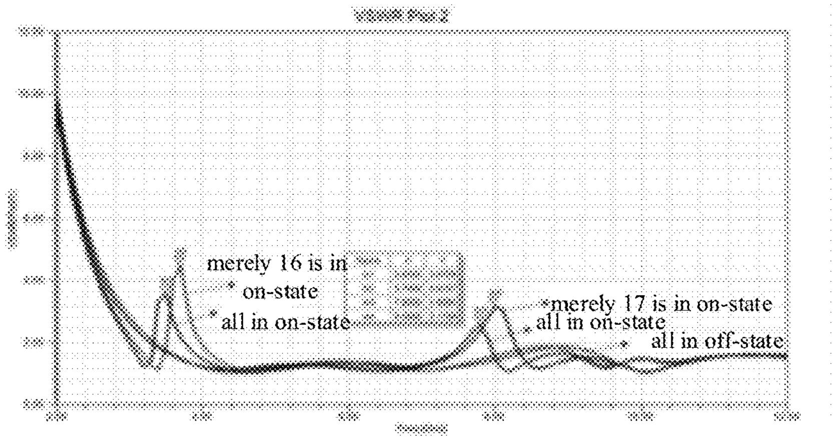
FIG. 25 is a simulation diagram of the ultra-wideband antenna shown in FIG. 24.

Simulation verification is performed to the ultra-wideband antenna shown in FIG. 24 according to an embodiment of the present application, to obtain the simulation result of the ultra-wideband antenna shown in FIG. 24, as shown in FIG. 25.

FIG. 25 shows a curve schematic diagram of the working frequency and the standing-wave ratio of the ultra-wideband antenna. As also may be seen from the curve in FIG. 25, when both of the two MEMS switches are in the off-state, under the standard that the standing-wave ratio (VSWR) is smaller than or equal to 2, the working frequency of the antenna may cover a frequency band of 3.36-12 GHz, and has the characteristic of ultra wide band, and has no trapped wave. In this case, the ultra-wideband antenna has a very wide working frequency band, may be applied in multiple types of communication systems, and has a relatively application.

As also may be seen from the curve in FIG. 25, when the first switch 16 is in the on-state and the second switch 17 is in the off-state, under the standard that the standing-wave ratio (VSWR) is larger than 2, the working frequency of the antenna may cover a frequency band of 3.36-12 GHz, and has the characteristic of ultra wide band. Furthermore, one single trapped wave appears in the working frequency band, wherein the frequency band of the trapped wave is 3.51-3.98 GHZ, and the center frequency point of the trapped wave is 3.7 GHZ. The ultra-wideband antenna has a very wide working frequency band, and may have no mutual interference with the electromagnetic wave of the frequency band of 3.51-3.98 GHz, so that the performance of the ultra-wide-band antenna is ensured.

As also may be seen from the curve in FIG. 25, when the first switch 16 is in the off-state and the second switch 17 is in the on-state, under the standard that the standing-wave ratio (VSWR) is larger than 2, the working frequency of the antenna may cover a frequency band of 3.36-12 GHz, and has the characteristic of ultra wide band. Furthermore, the frequency band of the trapped wave changes to the right with a wide span, wherein the frequency band of the trapped wave is 7.67-8.27 GHz, and the center frequency point of the trapped wave is 8 GHz. The ultra-wideband antenna has a very wide working frequency band, and may have no mutual interference with the electromagnetic wave of the frequency band of 7.67-8.27 GHz, the performance of the ultra-wide-band antenna is ensured.

As also may be seen from the curve in FIG. 25, when both of the two MEMS switches are in the on-state, under the standard that the standing-wave ratio (VSWR) is larger than 2, the working frequency of the antenna may cover a frequency band of 3.36-12 GHz, and has the characteristic of ultra wide band. Furthermore, the ultra-wideband antenna has double trapped waves, wherein the frequency bands of the trapped waves are 3.33-3.76 GHz and 7.57-7.92 GHz respectively, and the center frequency points of the trapped waves are 3.5 GHz and 7.8 GHz respectively. The ultra-wideband antenna has a very wide working frequency band, and may have no mutual interference with the electromagnetic waves of the frequency bands of 3.33-3.76 GHz and 7.57-7.92 GHz, the performance of the ultra-wide-band antenna is ensured.

It should be noted that, the wave-trapping unit may further include three or more grooves. Regarding three or more grooves, the opening directions of the grooves are not particularly limited herein. As an example, the opening directions of all of the grooves may be different. Alternatively, the opening directions of some of the grooves may be different, which is decided particularly according to practical applications.

In the ultra-wideband antenna according to the embodiments of the present application, by configuring that the opening direction of the first groove is opposite to the opening direction of the second groove, that is, the wave-trapping unit a double groove with reverse opening, for example, a double U-shaped groove with reverse opening shown in FIG. 24. based on that, in combination with the design of the first switch 16 and the second switch 17, large span reconstruction or small span reconstruction of no trapped wave or single trapped wave or double trapped-wave frequencies may be realized. Consequently, may reduce or even prevent mutual interference with various communication protocols of other frequency bands during use, the performance of the ultra-wide-band antenna is effectively improved, and the usage scenarios of the ultra-wideband antenna are broadened, so that the user experience is improved.

Optionally, referring to FIGS. 4-7, the switch 7 includes a micro-electromechanical system switch, the micro-electromechanical-system switch includes a cantilever beam 8, an end of the cantilever beam 8 is electrically connected to the radiating patch 4 at a side of the groove 6, and the other end of the cantilever beam 8 is configured to, in a first state, non-electrically connected to the radiating patch 4 at the other side of the groove 6, and in a second state, electrically connected to the radiating patch 4 at the other side of the groove 6.

The material of the cantilever beam is not particularly limited herein. As an example, the material of the cantilever beam may include metal or metal alloy, for example, copper (Cu), aluminum (Al), molybdenum/aluminum/molybdenum (Mo/Al/Mo) and copper alloy (MTD/Cu/MTD).

The embodiments of the present application provide an ultra-wideband antenna based on a MEMS switch that has the characteristic of being capable of reconstructing the trapped wave. This MEMS switch, as compared with other switches (for example, a PIN diode), has the advantages for example short response time (which may be as short as a microsecond grade), good temperature stability, low insertion loss and wide operation bandwidth and the like, so that enable the ultra-wideband antenna to have a good performance.

Optionally, referring to FIGS. 4-7, the radiating patch 4 at a side of the groove 6 has a first cubic block 9 in a direction along the groove 6, the radiating patch 4 at the other side of the groove 6 has a second cubic block 10 in the direction along the groove 6, and the first cubic block 9 is insulated from the second cubic block 10.

The micro-electromechanical system switch further includes a first electrode 12, an insulating layer 13 and a second electrode 14, and the first electrode 12 is provided between the first cubic block 9 and the second cubic block 10, and is insulated from both of the first cubic block 9 and the second cubic block 10. The insulating layer 13 is provided at a side of the first electrode 12 away from the first substrate 1. The second electrode 14 is provided at a side of the second cubic block 10 away from the first substrate 1, and is connected to the second cubic block 10. An end of the cantilever beam 8 is connected to a side of the first cubic block 9 away from the first substrate 1, and the other end of the cantilever beam 8 is configured to, when at least one of the first electrode 12 and the radiating patch 4 is not applied with a voltage, or a voltage difference between a voltage applied to the first electrode 12 and a voltage applied to the radiating patch 4 does not satisfy a driving voltage, not be connected to the second electrode 14, and when the voltage difference between the voltage applied to the first electrode 12 and the voltage applied to the radiating patch 4 satisfies the driving voltage, be connected to the second electrode 14.

The materials and the thicknesses of the first cubic block, the second cubic block, the first electrode and the second electrode are not particularly limited herein. As an example, the materials of the first cubic block, the second cubic block, the first electrode and the second electrode may all include metal or metal alloy, for example, copper (Cu), aluminum (Al), molybdenum/aluminum/molybdenum (Mo/Al/Mo) and copper alloy (MTD/Cu/MTD). As an example, ranges of the thicknesses of the first cubic block, the second cubic block, the first electrode and the second electrode along a direction perpendicular to the first substrate may include 15-18 μm. Particularly, the thicknesses of the first cubic block, the second cubic block, the first electrode and the second electrode along the direction perpendicular to the first substrate may be 15 μm, 16 μm, 17 μm, 18 μm and so on.

The first cubic block is insulated from the second cubic block above-mentioned refers to that the first cubic block is disconnected from the second cubic block. Alternatively, the first cubic block and the second cubic block are insulated by other structures. All of FIGS. 4-7 illustrate by taking the case as an example in which the first cubic block 9 is disconnected from the second cubic block 10 to be insulated.

The material, dielectric constant and thickness of the insulating layer are not particularly limited herein. As an example, the material of the insulating layer may include silicon nitride, silicon oxide and so on. As an example, silicon nitride with a dielectric constant of 7 may be used as the insulating layer. As an example, a range of the thickness of the insulating layer along the direction perpendicular to the first substrate may include 350-450 nm. Particularly, the thickness of the insulating layer along the direction perpendicular to the first substrate may be 350 nm, 380 nm, 400 nm, 420 nm, 450 nm and so on.

The suspending height, length, width and thickness of the cantilever beam under the state that it is not connected to the second electrode are not particularly limited herein. As an example, A range of the suspending height of the cantilever beam under the state that it is not connected to the second electrode may include 1.4-1.6 μm. Particularly, the suspending height of the cantilever beam under the state that it is not connected to the second electrode may be 1.4 μm, 1.5 μm, 1.6 μm and so on. As an example, a range of the length of the cantilever beam may include 135-145 μm. Particularly, the length of the cantilever beam may be 135 μm, 140 μm, 145 μm and so on. As an example, a range of the width of the cantilever beam may include 15-25 μm. Particularly, the width of the cantilever beam may be 15 μm, 20 μm, 25 μm and so on. As an example, a range of the thickness of the cantilever beam along the direction perpendicular to the first substrate may include 200-300 nm. Particularly, the thickness of the cantilever beam along the direction perpendicular to the first substrate may be 200 nm, 250 nm, 300 nm and so on.

The voltage difference between the voltage applied to the first electrode and the voltage applied to the radiating patch is not particularly limited herein. As an example, referring to FIG. 3, a range of the voltage difference between the voltage V1 applied to the first electrode and the voltage V2 applied to the radiating patch 4 may include 5-25V, and in this case the other end of the cantilever beam is connected to the second electrode. Particularly, the voltage difference between the voltage V1 applied to the first electrode and the voltage V2 applied to the radiating patch 4 may be 5V, 10V, 15V, 25V and so on.

Figure 19:
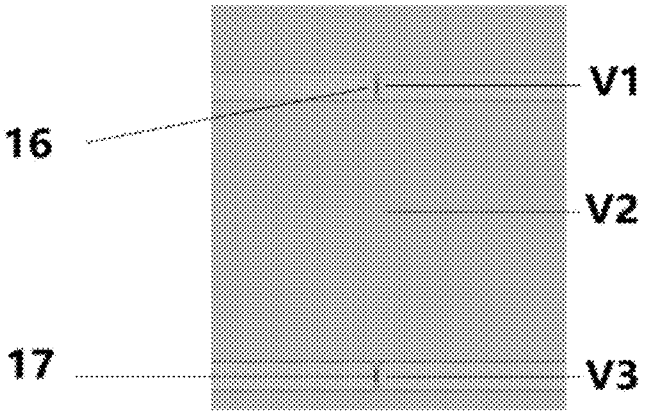
FIG. 19 is a partially enlarged schematic diagram of the first switch and the second switch in the ultra-wideband antenna shown in FIG. 18.
Figure 22:
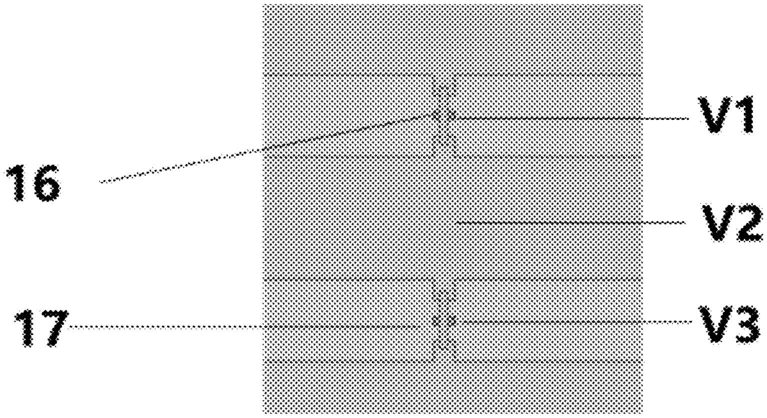
FIG. 22 is a partially enlarged schematic diagram of the first switch and the second switch in the ultra-wideband antenna shown in FIG. 21.

It should be noted that, when the ultra-wideband antenna has two or more switches, optionally, as shown in FIGS. 19 and 22, the first electrode of the first switch 16 is applied with a voltage V1, the radiating patch 4 is applied with a voltage V2, the first electrode of the second switch 17 is applied with a voltage V3, and the radiating patch 4 is applied with a voltage V2. Accordingly, the range of the voltage difference between the voltage V1 applied to the first electrode of the first switch 16 and the voltage V2 applied to the radiating patch 4 may include 5-25V, and the range of the voltage difference between the voltage V3 applied to the first electrode of the second switch 17 and the voltage V2 applied to the radiating patch 4 may include 5-25V, which is decided particularly according to practical demands.

The cantilever beam may further include a cantilever and a fixing anchor point, and the cantilever is fixed to the first cubic block by the fixing anchor point, so that the cantilever is suspended.

Figure 5:
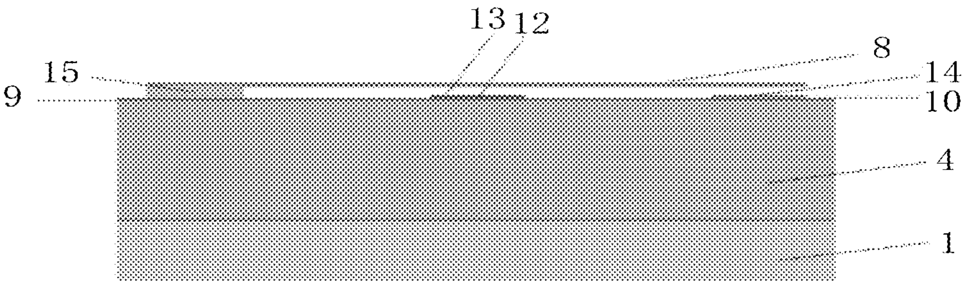
FIG. 5 is a right view of the switch in the on-state in the ultra-wideband antenna according to an embodiment of the present application.
Figure 6:
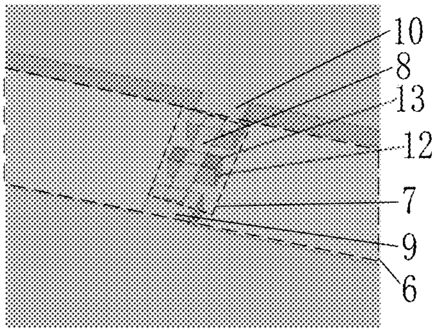
FIG. 6 is a side view of the switch in the off-state in the ultra-wideband antenna according to an embodiment of the present application.
Figure 7:
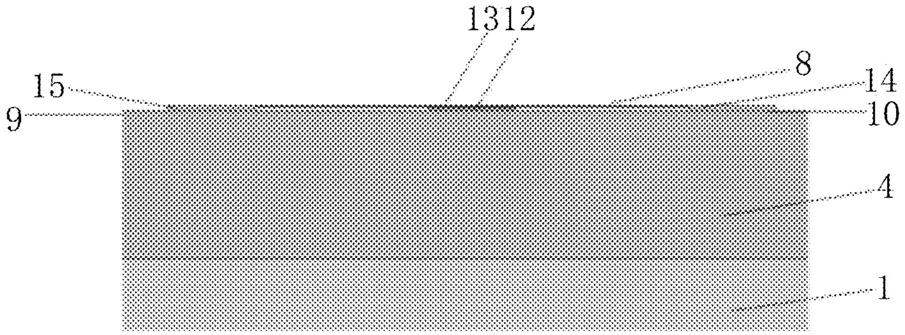
FIG. 7 is a right view of the switch in the off-state in the ultra-wideband antenna according to an embodiment of the present application.

The embodiments of the present application provide an ultra-wideband antenna based on a MEMS switch that has the characteristic of being capable of reconstructing the trapped wave. By controlling the magnitude of the voltage difference between the first electrode and the radiating patch of the MEMS cantilever beam, whether the cantilever beam is pulled down or not may be controlled, in other words, the radiating patches at both sides of the groove are controlled to be connected or disconnected, so that the reconstruction of the existence or inexistence of a trapped wave in the ultra-wideband antenna is realized. Particularly, the cantilever beam 8 is supported above the first cubic block 9 and the second cubic block 10 extending inside the U-shaped groove, and the cantilever (not shown in the figure) of the cantilever beam 8 is fixed to the first cubic block 9 by the fixing anchor point (not shown in the figure). When the MEMS switch is in the on-state (not applied with a voltage difference or the voltage difference does not satisfy the driving voltage), as shown in FIGS. 4 and 5, the cantilever spans the U-shaped groove and is suspended over the second electrode 14 above the second cubic block 10 at the other side. When the MEMS switch is in the off-state (the applied voltage difference satisfies the driving voltage), as shown in FIGS. 6 and 7, the cantilever is pulled down by the effect of the static electricity and contacts with the first electrode 11. In other words, the off or on of the MEMS switch may be controlled by using the voltage difference between V1 and V2 and/or V3 and V2, thereby controlling the existence or inexistence of a trapped wave in the ultra-wideband antenna.

Figure 2:
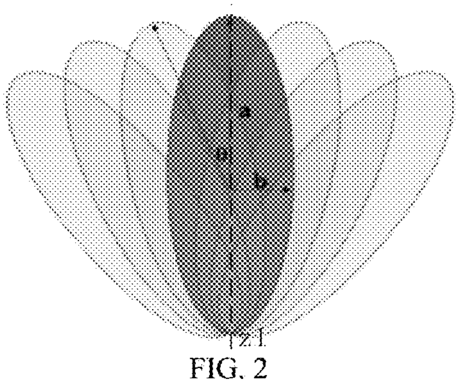
FIG. 2 is a schematic structural diagram of the radiating patch of the ultra-wideband antenna according to an embodiment of the present application.

Optionally, referring to FIG. 2, an orthographic projection pattern of the radiating patch 4 on the first substrate 1 includes a plurality of ellipses, and at least some of the ellipses among the plurality of ellipses are symmetrical about the first symmetry axis (z1 shown in the figure). Accordingly, the area of the radiating patch may be as large as possible, and ultra wide band and miniaturization of the volume of the antenna may be realized.

The quantity of the ellipses included by the orthographic projection pattern of the radiating patch on the first substrate is not particularly limited herein. As an example, referring to FIG. 2, the orthographic projection pattern of the radiating patch on the first substrate includes seven ellipses, and the seven ellipses may enable the orthographic projection of the radiating patch on the first substrate to form a petal shape.

The size relation and the arrangement direction of the plurality of ellipses above-mentioned are not particularly limited herein. As an example, the sizes of the plurality of ellipses above-mentioned may all be the same. Alternatively, the sizes of the plurality of ellipses above-mentioned may all be different. Alternatively, the sizes of the plurality of ellipses above-mentioned may be partially the same. As an example, the included angles between the extension directions of the adjacent ellipses among the plurality of ellipses above-mentioned may be the same. Alternatively, the included angles between the extension directions of the adjacent ellipses among the plurality of ellipses above-mentioned may be different. Alternatively, the included angles between the extension direction of the adjacent ellipses among the plurality of ellipses above-mentioned may be partially the same.

At least some of the ellipses among the plurality of ellipses are symmetrical about the first symmetry axis above-mentioned refers to that, some of the ellipses among the plurality of ellipses are symmetrical about the first symmetry axis, or the ellipses among the plurality of ellipses are all symmetrical about the first symmetry axis, which is not particularly limited herein. Referring to FIG. 2, among the seven ellipses, the first ellipse at the left of the first symmetry axis z1 and the seventh ellipse at the right of the first symmetry axis z1 are symmetrical about the first symmetry axis z1, and the rest may be done in the same manner, and are not discussed further.

Optionally, in order to simplify the manufacturing process and make the area of the radiation patch as large as possible, major axes of all of the plurality of ellipses are the same, and minor axes of all of the plurality of ellipses are the same; and the included angles between extension directions of the adjacent ellipses are the same.

The included angles between the extension directions of the adjacent ellipses are not particularly limited herein. As an example, referring to FIG. 2, a range of the included angles θ between the extension directions of the adjacent ellipses may include 10-15°. Particularly, θ may be 10°, 11°, 12°, 13°, 14°, 15° and so on. The radiating patch in FIG. 2 has a petal shape formed by overlapping of seven repeated ellipses obtained by the single ellipse in the middle being rotated leftwards to θ, 2θ and 3θ sequentially and rotated rightwards to θ, 2θ and 3θ sequentially.

The dimensions of the major axis a and the minor axis b of the ellipses above-mentioned are not particularly limited herein, and the dimensions of the major axis a and the minor axis b depend on the frequency band of the ultra-wideband antenna, and the area of the first substrate, and so on. As an example, a range of the major axis a of each of the ellipses may include 8-9 mm. Particularly, the major axis a of each of the ellipse may be 8 mm, 8.5 mm, 9 mm and so on. As an example, a range of the minor axis b of each of the ellipses may include 2-4 mm. Particularly, the minor axis b of each of the ellipses may be 2 mm, 3 mm, 4 mm and so on.

Some of the parameters in FIGS. 1, 11, 21 and 24 will be particularly described below.

In the U-shaped groove shown in FIG. 1, the included angle θ between the extension directions of the adjacent ellipses is 12°, the U-shaped groove has a length of 26.4 mm and a width of 0.2 mm, and the cantilever beam has a length of 140 μm, a width of 20 μm and a thickness of 250 nm. Both of the first cubic block and the second cubic block have a length of 50 μm and a thickness of 17 μm.

In the H-shaped groove shown in FIG. 11, the included angle θ between the extension directions of the adjacent ellipses is 13°, the H-shaped groove has a length of the transverse groove (along the direction of the second symmetry axis) of 7 mm, a length of the longitudinal groove (along the direction of the first symmetry axis) of 8 mm, and a width of 0.4 mm, and the first cubic block and the second cubic block have a length of 150 μm and a thickness of 17 μm.

In FIG. 21, the first U-shaped groove has a length of 26.4 mm and a width of 0.2 mm, the second U-shaped groove has a length of 23.4 mm and a width of 0.2 mm, the two U-shaped grooves have a spacing of 0.3 mm therebetween, and the included angle θ between the extension directions of the adjacent ellipses is 12°.

In FIG. 24, the first U-shaped groove has a length of 26.4 mm and a width of 0.2 mm, the second U-shaped groove has a length of 12.4 mm and a width of 0.2 mm, the two U-shaped grooves have a spacing of 0.5 mm therebetween, and the included angle θ between the extension directions of the adjacent ellipses is 13.5°.

Optionally, referring to FIG. 1, the feed structure 2 includes a feed line 21, a first grounding plate 22 and a second grounding plate 23, the feed line 21 is located between the first grounding plate 22 and the second grounding plate 23, and is spaced apart from both of the first grounding plate 22 and the second grounding plate 23, and the feed line 21 is connected to the radiating patch 4. Accordingly, a single-pole antenna of CPW electricity feeding is formed, which is simple and easy to be implemented.

The material of the grounding plate above-mentioned is not particularly limited herein. As an example, the material of the grounding plate may include metal or metal alloy, for example, copper (Cu), aluminum (Al), molybdenum/aluminum/molybdenum (Mo/Al/Mo) and copper alloy (MTD/Cu/MTD).

An embodiment of the present application further provides an electronic apparatus, wherein the electronic apparatus includes the ultra-wideband antenna stated above.

The electronic apparatus is suitable for various electric circuit scenarios based on glass substrate, which is not particularly limited herein.

According to the electronic apparatus provided by the embodiments of the present application, the existence or inexistence of a trapped wave in the ultra-wideband antenna of the electronic device is realized by using the wave-trapping unit, so that a novel electronic apparatus that having reconstructable trapped wave characteristics is provided, making the electronic apparatus does not only have the characteristic of a wide broadband, but also may reduce or even prevent mutual interference with communication protocols of other frequency bands during use, the performance of the electronic apparatus is effectively improved, and the usage scenarios of the electronic apparatus are broadened, the user experience is improved.

The description provided herein describes many specific details. However, it may be understood that, the embodiments of the present application may be implemented without these specific details. In some of the embodiments, well-known processes, structures and technologies are not described in detail, not to affect the understanding of the description.

Finally, it should be noted that, the above embodiments are merely intended to explain the technical solutions of the present application, and not to limit them. Although the present application is explained in detail with reference to the above embodiments, a person skilled in the art should understand that he can still modify the technical solutions set forth by the above embodiments, or make equivalent substitutions to part of the technical features of them. However, these modifications or substitutions do not make the essence of the corresponding technical solutions depart from the spirit and scope of the technical solutions of the embodiments of the present application.

The invention claimed is:

1. An ultra-wideband antenna, wherein the ultra-wideband antenna comprises: a first substrate; a feed structure provided at a side of the first substrate; and a radiating structure provided at the side of the first substrate and electrically connected to the feed structure; wherein the radiating structure comprises a radiating patch and a wave-trapping unit, and the radiating patch is electrically connected to the feed structure; wherein the wave-trapping unit comprises at least one groove, and the groove penetrates through the radiating patch; and a part of the radiating patch that is not penetrated through by the groove is configured to, under the condition of being in a disconnection state, be capable of controlling a working frequency band of the ultra-wideband antenna to have a trapped wave, and under the condition of being in a connection state, be capable of controlling the working frequency band of the ultra-wideband antenna not to have the trapped wave; wherein the wave-trapping unit further comprises a switch, and the switch is configured to be capable of controlling whether the part of the radiating patch that is not penetrated through by the groove is disconnected; wherein the wave-trapping unit comprises one groove, an orthographic projection of a pattern formed by an outer contour of the groove on the first substrate comprises a first sub-part, a connecting part and a second sub-part, and the first sub-part is communicated to the second sub-part by the connecting part; an extension direction of the first sub-part and an extension direction of the second sub-part are both different from an extension direction of the connecting part; and an orthographic projection of the switch on the first substrate is located on a first symmetry axis of an orthographic projection of a pattern formed by an outer contour of the connecting part on the first substrate; wherein the connecting part comprises a second sub-connecting part and a third sub-connecting part, the extension direction of the first sub-part and the extension direction of the second sub-part are the same, and an extension direction of the second sub-connecting part and an extension direction of the third sub-connecting part are the same, and the extension direction of the first sub-part is perpendicular to the extension direction of the second sub-connecting part; both ends of the second sub-connecting part are communicated to an end of the first sub-part and an end of the second sub-part respectively, and both ends of the third sub-connecting part are communicated to a geometric center of the first sub-part and a geometric center of the second sub-part; and the orthographic projection of the switch on the first substrate is located on a first symmetry axis of an orthographic projection of a pattern formed by an outer contour of the second sub-connecting part on the first substrate; or the orthographic projection of the switch on the first substrate is located on a first symmetry axis of an orthographic projection of a pattern formed by an outer contour of the third sub-connecting part on the first substrate.

2. The ultra-wideband antenna according to claim 1 wherein an orthographic projection of the switch on the first substrate at least partially overlaps with the orthographic projection of the pattern formed by the outer contour of the groove on the first substrate; and the switch is configured to, under the condition of being in an on-state, be capable of controlling the part of the radiating patch that is not penetrated through by the groove to be in the disconnection state, and under the condition of being in an off-state, be capable of controlling the part of the radiating patch that is not penetrated through by the groove to be in the connection state.

3. The ultra-wideband antenna according to claim 2, wherein the orthographic projection of the switch on the first substrate is located within the orthographic projection of the pattern formed by the outer contour of the groove on the first substrate.

4. The ultra-wideband antenna according to claim 3, wherein the orthographic projection of the pattern formed by the outer contour of the groove on the first substrate is a symmetrical pattern, and the symmetrical pattern is symmetrical about a first symmetry axis; and the orthographic projection of the switch on the first substrate is located on the first symmetry axis of the orthographic projection of the pattern formed by the outer contour of the groove on the first substrate.

5. The ultra-wideband antenna according to claim 1, wherein the connecting part comprises one or more sub-connecting parts, and the first sub-part is communicated to the second sub-part by all of the sub-connecting parts; the extension direction of the first sub-part and the extension direction of the second sub-part are both different from extension directions of all of the sub-connecting parts; and the orthographic projection of the switch on the first substrate is located on a first symmetry axis of an orthographic projection of a pattern formed by outer contours of each of the sub-connecting parts.

6. The ultra-wideband antenna according to claim 5, wherein the connecting part comprises a first sub-connecting part, and the extension direction of the first sub-part and the extension direction of the second sub-part are the same, and are all perpendicular to an extension direction of the first sub-connecting part; both ends of the first sub-connecting part are communicated to an end of the first sub-part and an end of the second sub-part respectively; and the orthographic projection of the switch on the first substrate is located on a first symmetry axis of an orthographic projection of a pattern formed by an outer contour of the first sub-connecting part on the first substrate.

7. The ultra-wideband antenna according to claim 5, wherein the connecting part comprises a first sub-connecting part, and the extension direction of the first sub-part and the extension direction of the second sub-part are the same, and are all perpendicular to an extension direction of the first sub-connecting part; both ends of the first sub-connecting part are communicated to a geometric center of the first sub-part and a geometric center of the second sub-part respectively; and the orthographic projection of the switch on the first substrate is located on a first symmetry axis of an orthographic projection of a pattern formed by an outer contour of the first sub-connecting part on the first substrate.

8. The ultra-wideband antenna according to claim 1, wherein the wave-trapping unit is configured to also be capable of controlling a frequency band in the working frequency band of the ultra-wideband antenna having a trapped wave.

9. The ultra-wideband antenna according to claim 8, wherein the connecting part comprises a second sub-connecting part and a third sub-connecting part, the extension direction of the first sub-part and the extension direction of the second sub-part are the same, and an extension direction of the second sub-connecting part and an extension direction of the third sub-connecting part are the same, and the extension direction of the first sub-part is perpendicular to the extension direction of the second sub-connecting part; both ends of the second sub-connecting part are communicated to an end of the first sub-part and an end of the second sub-part respectively, and both ends of the third sub-connecting part are communicated to a geometric center of the first sub-part and a geometric center of the second sub-part respectively; the switch comprises a first switch and a second switch, and an orthographic projection of the first switch on the first substrate is located on a first symmetry axis of an orthographic projection of a pattern formed by an outer contour of the third sub-connecting part on the first substrate; and an orthographic projection of the second switch on the first substrate is located on a first symmetry axis of an orthographic projection of a pattern formed by an outer contour of the second sub-connecting part on the first substrate.

10. The ultra-wideband antenna according to claim 4, wherein the wave-trapping unit is configured to be capable of controlling a number of trapped waves that appear in the working frequency band of the ultra-wideband antenna.

11. The ultra-wideband antenna according to claim 10, wherein the wave-trapping unit comprises a first groove and a second groove, and a length of an orthographic projection of an outer contour of the first groove on the first substrate is different from a length of an orthographic projection of an outer contour of the second groove on the first substrate; the switch comprises a first switch and a second switch, and an orthographic projection of the first switch on the first substrate is located on a first symmetry axis of an orthographic projection of a pattern formed by an outer contour of the second groove on the first substrate; and an orthographic projection of the second switch on the first substrate is located on a first symmetry axis of an orthographic projection of a pattern formed by an outer contour of the first groove on the first substrate.

12. The ultra-wideband antenna according to claim 11, wherein the length of the orthographic projection of the outer contour of the first groove on the first substrate is larger than the length of the orthographic projection of the outer contour of the second groove on the first substrate, an opening direction of the first groove and an opening direction of the second groove are the same, and the second groove is nested in the first groove, and is spaced apart from the first groove.

13. The ultra-wideband antenna according to claim 11, wherein an opening direction of the first groove is opposite to an opening direction of the second groove, and the first groove and the second groove are spaced apart from each other.

14. The ultra-wideband antenna according to claim 2, wherein the switch comprises a micro-electromechanical system switch, the micro-electromechanical system switch comprises a cantilever beam, an end of the cantilever beam is electrically connected to the radiating patch at a side of the groove, and the other end of the cantilever beam is configured to, in a first state, non-electrically connected to the radiating patch at the other side of the groove, and in a second state, electrically connected to the radiating patch at the other side of the groove.

15. The ultra-wideband antenna according to claim 14, wherein the radiating patch at a side of the groove has a first cubic block in a direction along the groove, the radiating patch at the other side of the groove has a second cubic block in the direction along the groove, and the first cubic block is insulated from the second cubic block;

the micro-electromechanical system switch further comprises a first electrode, an insulating layer and a second electrode, and the first electrode is provided between the first cubic block and the second cubic block, and is insulated from both the first cubic block and the second cubic block;

the insulating layer is provided at a side of the first electrode away from the first substrate;

the second electrode is provided at a side of the second cubic block away from the first substrate, and is connected to the second cubic block; and an end of the cantilever beam is connected to a side of the first cubic block away from the first substrate, and the other end of the cantilever beam is configured to, when at least one of the first electrode and the radiating patch is not applied with a voltage, or a voltage difference between a voltage applied to the first electrode and a voltage applied to the radiating patch does not satisfy a driving voltage, not be connected to the second electrode, and when the voltage difference between the voltage applied to the first electrode and the voltage applied to the radiating patch satisfies the driving voltage, be connected to the second electrode.

16. An electronic apparatus, wherein the electronic apparatus comprises the ultra-wideband antenna according to claim 1.

* * * * *